United States Patent [19]
Robinson et al.

[11] Patent Number: 5,769,442
[45] Date of Patent: *Jun. 23, 1998

[54] STRUCTURAL SHELL FRAMES AND METHOD OF MAKING SAME

[75] Inventors: Alexander J. Robinson, Salt Lake City; Christopher O. Paragas, Kearns, both of Utah

[73] Assignee: TekSource, HLC, Draper, Utah

[*] Notice: The term of this patent shall not extend beyond the expiration date of Pat. No. 5,464,240.

[21] Appl. No.: 541,371

[22] Filed: Oct. 10, 1995

Related U.S. Application Data

[63] Continuation-in-part of Ser. No. 189,590, Jan. 31, 1994, Pat. No. 5,464,240.

[51] Int. Cl.$^6$ ..................................................... B62K 3/02
[52] U.S. Cl. .................................... 280/281.1; 280/288.3; 52/732.1; 52/735.1
[58] Field of Search .................................. 280/274, 275, 280/281.1, 288, 288.3, 283; 52/732.1, 732.2, 735.1, 731.2, 731.3

[56] References Cited

U.S. PATENT DOCUMENTS

| | | | |
|---|---|---|---|
| Re. 32,242 | 9/1986 | Minnebraker | 280/242 |
| D. 306,712 | 3/1990 | Freidrich | D12/133 |
| 2,425,574 | 8/1947 | Stewack | 188/20 |
| 2,454,640 | 11/1948 | Eichner | 52/735.1 X |
| 2,824,597 | 2/1958 | Lerman | 155/30 |
| 3,356,185 | 12/1967 | Isaacks | 188/31 |
| 3,533,643 | 10/1970 | Yamada | 280/281.1 |
| 3,618,968 | 11/1971 | Greer | 280/47.11 |
| 3,897,857 | 8/1975 | Rodaway | 188/2 |
| 3,901,527 | 8/1975 | Danziger | 280/34 |
| 3,964,786 | 6/1976 | Mashuda | 297/330 |
| 4,067,589 | 1/1978 | Hon | 280/278 |
| 4,280,595 | 7/1981 | Timms et al. | 188/31 |
| 4,373,665 | 2/1983 | Dietzsch | 237/12.3 |
| 4,431,076 | 2/1984 | Simpson | 180/65 |
| 4,489,955 | 12/1984 | Hamilton | 280/242 |
| 4,500,102 | 2/1985 | Haury et al. | 280/242 |
| 4,501,033 | 2/1985 | Kessel et al. | 5/200 |

(List continued on next page.)

FOREIGN PATENT DOCUMENTS

| | | | |
|---|---|---|---|
| 895046 | 1/1954 | France | 280/281.1 |
| 448310 | 5/1950 | Italy | 280/281.1 |
| 19193 | 10/1895 | United Kingdom | 280/281.1 |

OTHER PUBLICATIONS

Derby Cycle Corporation., "1994 Raleigh Bicycle Buyer's Guide" 1993 Diamond Back Mountain Brochure.
Trek Bicycle Corporation., "Trek 1994 Hand Built in the U.S.A." Brochure GT Bicycles Inc. . . . , 1993 Dual Forces.
The Nashbar 3000x ATB Bike (Advertisement) Trek Bicycle Corporation., "1993 Trek Road OCLV," 1992.
Lawee, Inc., Rocket Scientist/Univega Brochure. Mountain Bikes/Road Bikes—Diamond Back Brochure.
Scott catalogue Advance Mountain—Collection of advertisements.

*Primary Examiner*—Kevin Hurley
*Attorney, Agent, or Firm*—Daniel McCarthy; Mark Sandbaken; Brick Power

[57] ABSTRACT

A structure for frames for bicycles, wheelchairs, and other vehicles, as well as components thereof and other devices requiring a strong, lightweight frame shell. The preferred frame structure is constructed from plastic molded partial shells that are assembled into shells (such as tubing) that comprises the frame. The partial shells have protrusions and receptacles on the joining faces of their skins that are used to join the partial shells together to form the assembled shell. This results in a lightweight, durable and aesthetically pleasing frame. In an alternative embodiment, the partial shells have protrusions and receptacles within their interiors for additional strength. Additional attachment mechanisms such as screws, bolts, nails, clips or rivets may be used for reinforcement of the partial shells. A method for manufacturing the frame is also disclosed.

48 Claims, 17 Drawing Sheets

U.S. PATENT DOCUMENTS

| | | | |
|---|---|---|---|
| 4,548,422 | 10/1985 | Michel et al. | 280/288.3 |
| 4,550,927 | 11/1985 | Resele | 280/281.1 |
| 4,593,929 | 6/1986 | Williams | 280/650 |
| 4,598,944 | 7/1986 | Meyer et al. | 297/183 |
| 4,652,005 | 3/1987 | Hartwell | 280/242 |
| 4,733,755 | 3/1988 | Manning | 188/2 |
| 4,768,797 | 9/1988 | Friedrich | 280/242 |
| 4,781,644 | 11/1988 | Yoshida | 52/732.1 X |
| 4,865,337 | 9/1989 | Disler et al. | 280/7.1 |
| 4,902,458 | 2/1990 | Trimble | 280/288.3 X |
| 4,953,913 | 9/1990 | Graebe | 297/459 |
| 4,989,890 | 2/1991 | Lockard et al. | 280/42 |
| 5,011,172 | 4/1991 | Bellanca et al. | 282/288.3 |
| 5,028,065 | 7/1991 | Danecker | 280/250.1 |
| 5,060,962 | 10/1991 | McWethy | 280/304.1 |
| 5,092,614 | 3/1992 | Malewicz | 280/11.22 |
| 5,120,071 | 6/1992 | Thibault et al. | 280/474 |
| 5,122,210 | 6/1992 | Kubomura et al. | 280/281.1 X |
| 5,152,543 | 10/1992 | Sims et al. | 280/250.1 |
| 5,176,393 | 1/1993 | Robertson et al. | 280/250.1 |
| 5,181,732 | 1/1993 | Bezin et al. | 280/281.1 X |
| 5,203,433 | 4/1993 | Dugas | 188/2 F |
| 5,240,276 | 8/1993 | Coombs | 280/647 |
| 5,242,179 | 9/1993 | Beddome et al. | 280/233 |
| 5,249,847 | 10/1993 | Lee | 301/105.1 |
| 5,253,888 | 10/1993 | Friedrich | 280/250.1 |
| 5,269,196 | 12/1993 | Rafac | 74/551.1 |
| 5,533,742 | 7/1996 | Peart | 280/288.3 X |

STRUCTURAL SHELL FRAMES AND METHOD OF MAKING SAME

CONTINUITY

This patent application is a continuation-in-part of U.S. patent application Ser. No. 08/189,590, filed Jan. 31, 1994, now U.S. Pat. No. 5,464,240.

BACKGROUND OF INVENTION

A. Field of Invention

This invention relates to the field of lightweight, durable, molded frames. More particularly, this invention relates to frames comprising a plurality of partial shells that have been molded from composite materials and that can be assembled to form a unitary monocoque frame that is strong, durable and lightweight. This invention also relates to a method for making the frame.

B. The Background Art

In the prior art, the structural frames of lightweight, human-powered vehicles such as bicycles, wheelchairs and the like have typically been made according to three methods: (1) joined tubing, (2) inflation-cured shells, (3) truss structures and (4) partial frame assemblies.

1. Joined Tubing.

Joined tubing frames typically consist of metal tubing (such as steel, aluminum, titanium, etc.) that is either (1) brazed or adhesively bonded into lugs, or (2) miter-cut and welded tube-to-tube. An example of a bicycle frame consisting of hexagonal frame tubes which are connected by lugs is disclosed in U.S. Pat. No. 3,533,643, which is incorporated herein in its entirety. Alternatively, joined tubing frames may be made of fiber-reinforced plastic (i.e. composite or "FRP") tubing that is adhesively bonded into lugs. Another common method of manufacturing frames from FRP tubing consists of forming composite lugs over pre-fabricated composite tubing.

Each of these methods of manufacturing frames from tubing is labor intensive, difficult to automate and therefore expensive. These methods also result in frames that are heavy because of the structural inefficiency of the joints of the frame. The joints are structurally inefficient because in order to achieve desired strength tolerances, tubing in the vicinity of the joints must be thick in comparison with the tubing at the center of the tube. Dual-thickness tubes such as these are referred to in the art as "double butted tubing" and add substantial weight to the resulting frame. Also, the lugs or joints into which the tubing is bonded or brazed must be relatively thick and hence heavy because the bending and torsional loads are inefficiently transferred to the lugs or joints from the non-integral tubing. The joined tubing frames made by these methods are unattractive to some users because of the angular, geometric appearance as opposed to more desirable smooth, flowing lines.

2. Inflation-Cured Shells.

Frames for lightweight vehicles may also be constructed by a method that eliminates tubing and joints, and results in a one-piece hollow shell, referred to in the art as a "monocoque" frame. The method uses composite materials consisting of a combination of structural fibers (such as carbon fiber and fiberglass) and thermoset resins (such as epoxy). When practicing the method, the fibers and resin are placed around an inflatable bladder (made from materials such as nylon film) or an expandable material (such as a heat-expandable foam). The assembly is placed in a cavity mold, and either the bladder is inflated or the expandable material naturally expands from the heat applied to cure the thermoset resin. This inflation or expansion presses the fiber and resin against the cavity mold walls conforming it to the shape of the mold during the curing of the resin. The mold is opened after the cure is complete, and the inflatable bladder or the expandable material permanently remains on the interior of the vehicle frame.

While this method eliminates joints and hence would seem to have the potential to reduce weight, it introduces other weight-increasing factors which offset the potential weight savings. The fibers are only strong in the fiber direction, and fibers are generally only available in single direction tape or two-direction (woven) cloth. In order for loads on the frame to be properly carried, the fiber must be plied in a number of layers, each in a different directional orientation. This is so that fibers will be directed in all directions from which a force may be applied to the frame. The end result is a significant thickness of the frame walls, especially in areas of the frame which are angled or bent (typically the same places on a frame which would be joints in a joined tubing frame), resulting in a frame which is heavy. Frames made by this method are typically brittle and subject to cracking from use and even shattering on impact, giving them a shorter product life compared to the invented frame. Also, frames made by this method are typically even more expensive to produce than joined-tubing frames because the process is very labor intensive and the amortized mold costs are very high since a mold can produce only one part every few hours. The frames made by this method can be very attractive, however, due to the flowing lines around the angles and bends.

3. Truss Structures.

Frames for lightweight vehicles may also be manufactured in a truss structure configuration. Generally a truss structure is comprised of a plurality of plate shells that are each parallel to each other in a first direction, but may be of any thickness or shape in the second and third dimension. Typically the plates are parallel to each other in a first direction and thick in that direction, with different plates being thick and thin in second and third directions of varying orientation. This provides the frame with strength and rigidity in all three directions while resulting in a frame that can be injection molded and is lightweight. U.S. Pat. No. 4,067,589 discloses a foldable bicycle with a plurality of intersecting ribs forming part of the frame. This patent is incorporated by reference in its entirety.

Truss structure frames are inexpensive to manufacture, structurally sound, durable and lightweight, but users may have three basic objections to their use. First, the exposed edges of the thin truss structure plates are more subject to damage than are round-tubed or hollow-shelled structures. This may be a particular concern on vehicles that undergo use in extreme conditions, such as mountain bikes. Second, the appearance of the open truss structure is not attractive to some users because they prefer the smooth flowing lines of tubing. Third, the open truss structure can collect dirt, mud, debris, etc., and be difficult to clean because of limited access to the crevices of the truss structure. Round-tubed or hollow-shelled structures collect less dirt, mud, and debris and are easy to clean because dirt, mud, and debris can collect only on easily accessible areas, not in difficult to reach joints and crevices.

4. Partial Frame Assemblies

Frames for lightweight vehicles may also be constructed by a method that eliminates tubing and joints, and results in a one-piece hollow frame, referred to in the art as a "monocoquell" frame. Such a method is disclosed in U.S. Pat. No. 4,548,422, which is incorporated herein by reference in its entirety. The disclosed method uses composite materials consisting of a combination of structural fibers (such as fiberglass) and resins (such as polyester). When practicing the method, partial frames are joined by gluing or using mechanical attachments. The disclosed tubing, however, lacks interlocking mechanisms at the seams such that the joined partial frames do not rigidly engage each other to prevent the partial frames from separating along the joints.

U.S. Pat. No. 5,011,172 discloses a method for making bicycle frames using C- or U-shaped subassemblies. This patent is incorporated herein in its entirety. An subassembly can have overlapping parts or a tongue and groove mechanism, creating a double thickness of material at the seams. Such a seam adds unnecessary weight to the frame and lacks sufficient attachment at the seams to prevent the joined assemblies from separating along the joints. Also, the tongue and groove lacks sufficient interlocking mechanism to prevent the seams from separating when tension is applied along the seam.

U.S. Pat. No. 4,550,927 discloses overlapping die-cast light metal shells which are adhesively joined along the edges. This patent is incorporated herein in its entirety. Such a metal frame with overlapping joints adds unnecessary weight to the frame and the structure of the joint lacks sufficient interlocking mechanisms to prevent the seams from separating when tension is applied along the joint.

SUMMARY OF INVENTION

The object of this invention is to provide a frame for a lightweight vehicle which is inexpensive to manufacture, lightweight, strong, durable, long-lasting, aesthetically attractive, free of exposed sharp edges, free of areas which would trap dirt, mud, and debris, and easy to clean. These objects are achieved by a vehicle frame that is molded as two or more partial shells (sometimes half shells) which, when joined together, form an externally complete hollow shell. In the preferred embodiment the exterior of the shell is smooth and continuous with no sharp edges, resembling prior art tubing or monocoque construction. The preferred shell may include interior structural reinforcing shells that both facilitate easy assembly of the partial shells with each other and that strengthen the resulting frame. For some frames, however, this additional reinforcement is not required. In the preferred embodiment, the partial shells can be injection molded. The partial shells may be attached by using attachment mechanisms, or they may be joined with glue, resulting in an inexpensive and efficient manufacturing process and a high-strength, low-cost, attractive end-product.

It is a further object of this invention to provide structural frame components for all types of lightweight vehicles which are inexpensive to manufacture, lightweight, strong, durable, long-lasting, aesthetically attractive, free of exposed sharp edges, free of areas which would trap dirt, mud, and debris, and easy to clean. These objects are achieved by a structural component that is molded as two or more partial shells (sometimes half shells) which, when joined together, form an externally complete hollow shell. Some vehicles may require a traditional main frame, but can benefit by using the invented structure for additional framing components.

Additional objects, features and advantages of the invention will become apparent to persons of ordinary skill in the art upon reading the specification in light of the appended drawings.

DESCRIPTION OF THE PREFERRED EMBODIMENTS a. A Bicycle Frame

Figure 1:
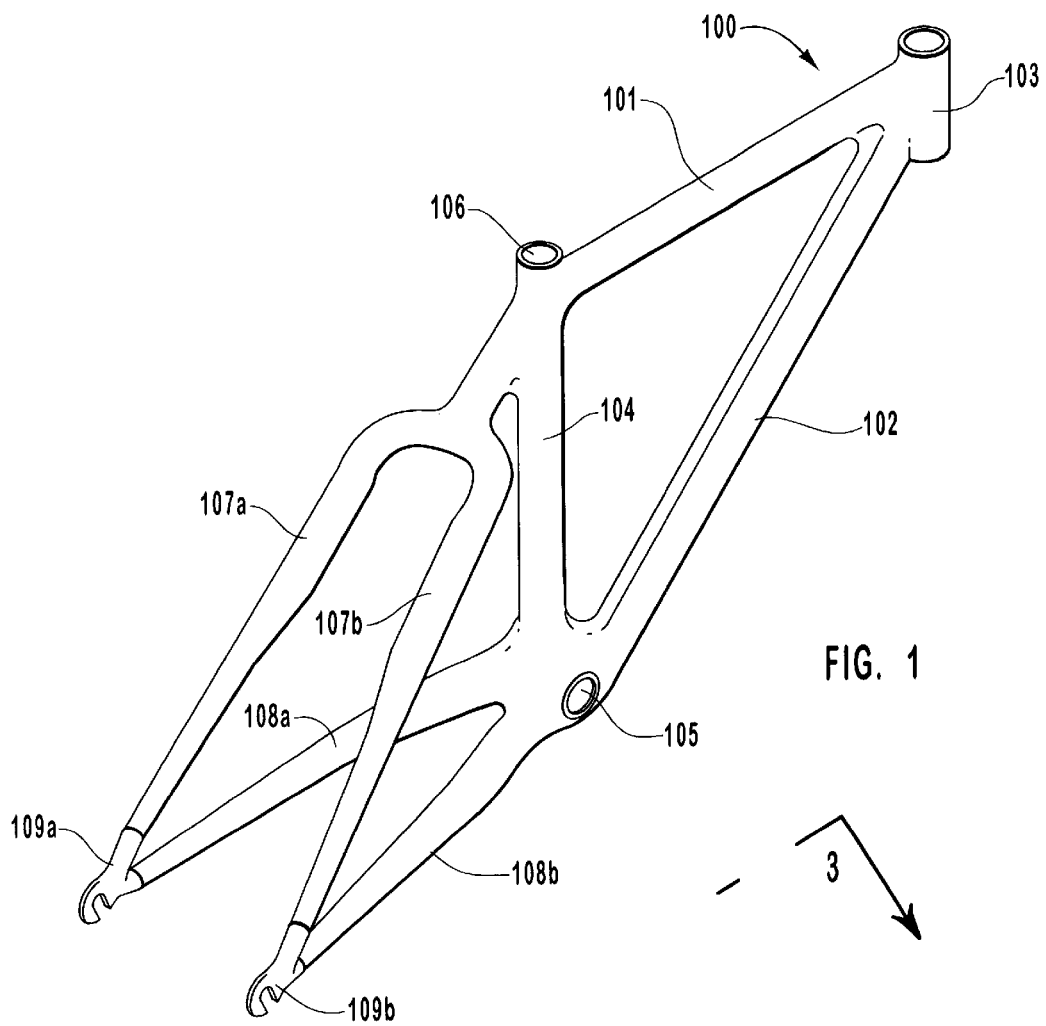
FIG. 1 depicts a perspective view of one preferred embodiment of a mountain bike frame of the invention.
Figure 2:
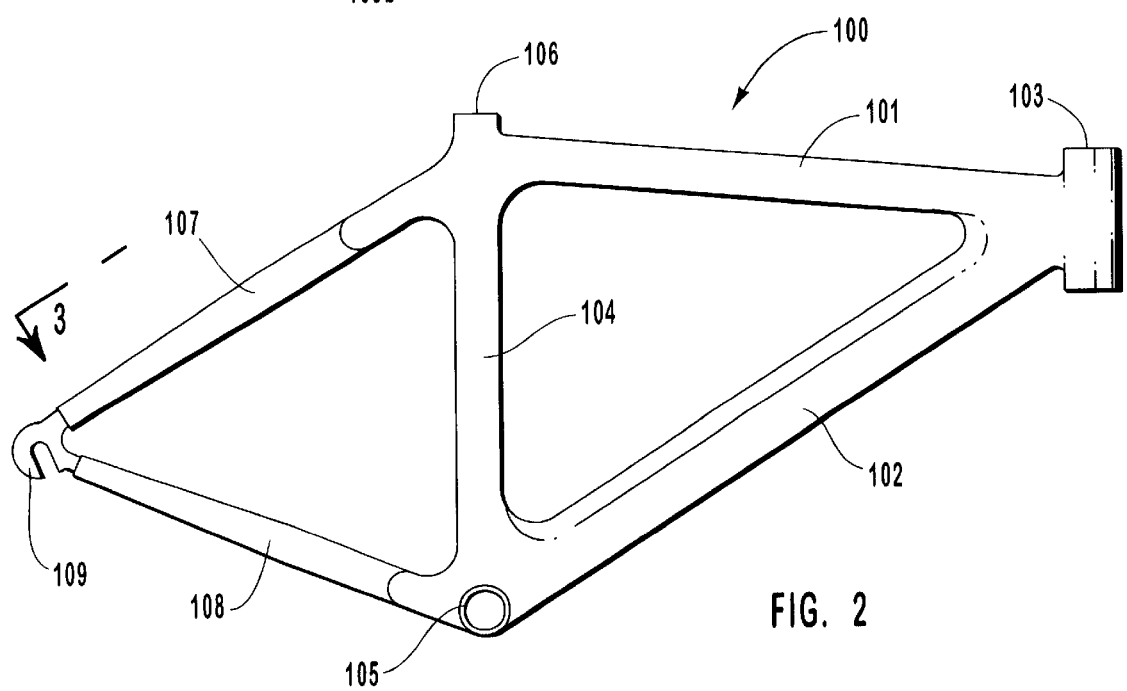
FIG. 2 depicts a side view of the frame of FIG. 1.

FIG. 1 shows an assembled all-terrain bicycle frame 100 of one preferred embodiment of the invention, commonly referred to in the art as a mountain bike frame. The frame comprises the following elements: a top tube 101, a down tube 102, a head tube 103 (into which a fork is to be mounted), a seat tube 104, a bottom bracket 105, a seat post receptacle 106, left and right seat stays 107a and 107b respectively, left and right chain stays 108a and 108b respectively, and left and right rear axle dropouts 109a and 109b respectively. The dropouts 109 are typically metal, but can be constructed using the invented frame structure. FIG. 2 shows a side view of the assembled frame 100 of FIG. 1 with a section indicated by the digit 3. The existence and general arrangement of these elements is known in the art and not considered to be the invention. The invention is expressed in the particular structural characteristics used in these elements and the method for making a bicycle frame to provide those characteristics.

Figure 3:
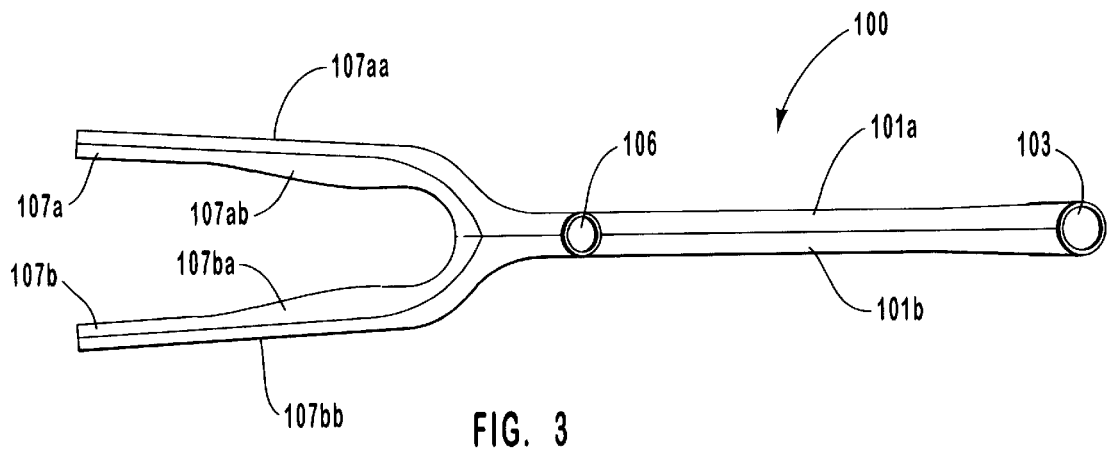
FIG. 3 depicts a view of the frame of FIG. 2 along the line bearing the number 3 in FIG. 1.
Figure 4:
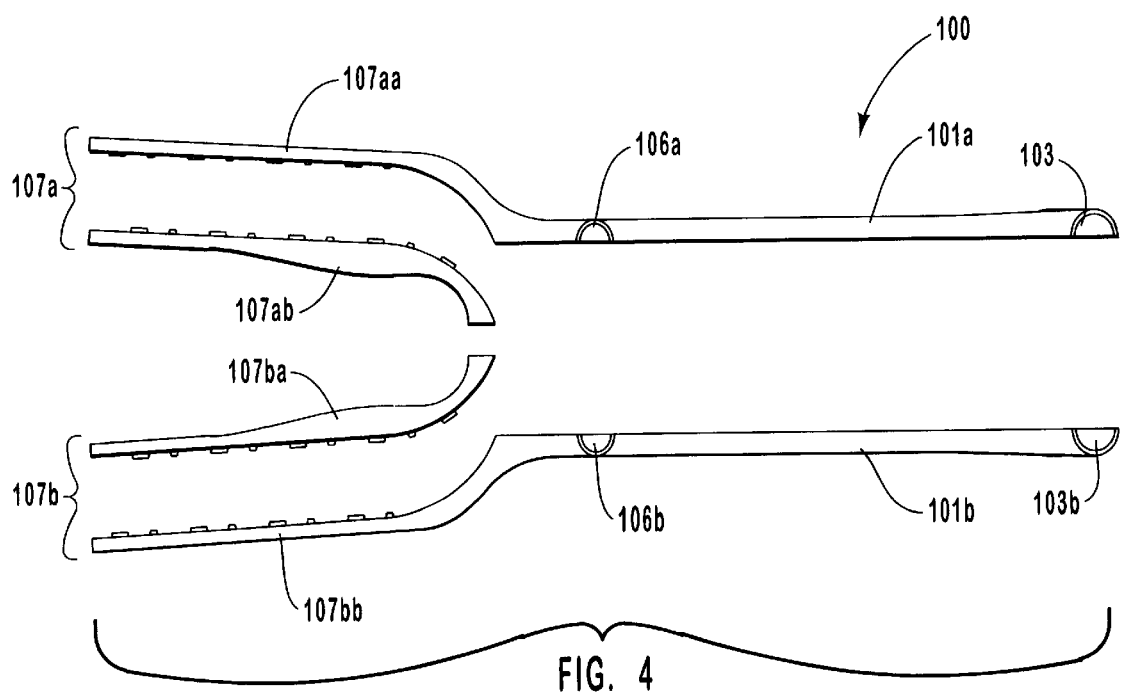
FIG. 4 depicts an exploded (unassembled) top view of the frame of FIGS. 1–3.

FIG. 3 shows a top view of the assembled frame 100 of FIGS. 1 and 2. FIG. 4 shows an exploded (unassembled) top view of the assembled frame 100 of FIGS. 1–3. From FIGS. 3 and 4 it can be seen that the frame 100 is constructed from a left main partial (or half) shell 101a and a right main partial shell 101b. Similarly, each of the seat stays 107a and 107b comprises an inner seat stay shell and an outer seat stay shell. Left seat stay 107a has a left outer seat stay shell 107aa that is integral with left main shell 101a. Right seat stay 107b has a right outer seat stay shell 107bb that is integral with right main shell 101b. Left seat stay 107a also has a left inner seat stay 107ab that is a separate partial shell from the left main shell 101a and that can be assembled with the left outer seat stay 107aa as shown in FIG. 3. Right seat stay 107b also has a right inner seat stay 107ba that is a separate partial shell from the right main shell 101b and that can be assembled with the right outer seat stay 107bb as shown in FIG. 3. Alternatively, it is possible to construct a bicycle frame using the invented structure, but using one-third shells or one-quarter shells which assemble into a frame. The drawings depict the use of half shells because half shells are preferred, but generally two or more shell portions can be assembled using the invented structure.

Figure 3A:
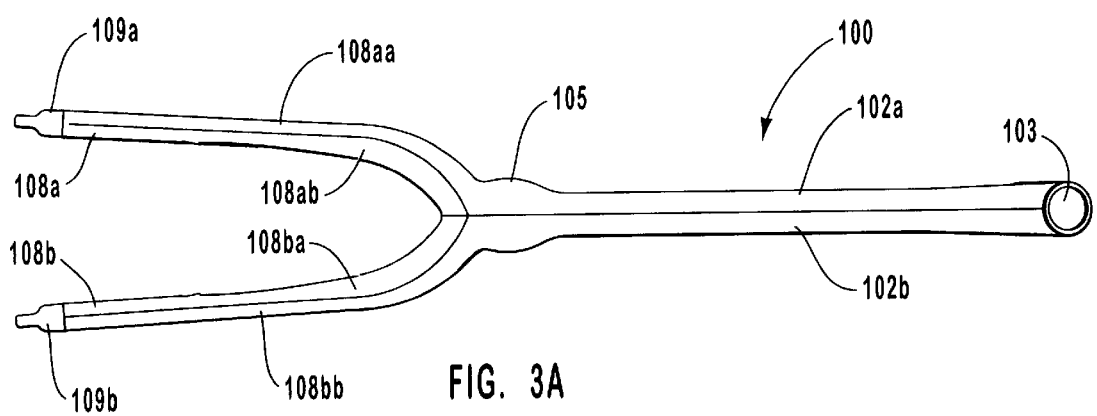
FIG. 3a depicts a bottom view of the frame of FIGS. 1, 2 and 3.

FIG. 3a shows a bottom view of frame 100 having left and right chain stays 108a and 108b whose construction and componentry is very similar to that of left and right seat stays 107a and 107b. Left chain stay 108a has a left outer chain stay shell 108aa that is integral with left main shell 101a. Right chain stay 108b has a right outer chain stay shell 108bb that is integral with right main shell 101b. Left chain stay 108a also has a left inner chain stay 108ab that is a separate partial shell from the left main shell 101a and that can be assembled with the left outer chain stay 108aa. Right chain stay 108b also has a right inner seat stay 108ba that is a separate partial shell from the right shell 101b and that can be assembled with the right outer chain stay 108bb.

As described and as shown in FIGS. 1–4, the frame of this preferred embodiment of the invention is constructed from six partial shells: left main shell 101a and right main shell 101b which are joined in the assembled frame, two inner seat stays 107b and 107ba that are joined to the outer seat stays 107aa and 107bb of the main shells 101a and 101b respectively, and two inner chain stays 108ab and 108ba that are joined to the outer chain stays 108aa and 108bb of the main shells 101a and 101b respectively. The result is a bicycle frame 100 that can be manufactured by injection molding six separate partial shell components and then assembling the components. The division of the frame 100 into the six separate assemblable elements described above and shown in FIGS. 3 and 4 has been chosen in this preferred embodiment of the invention to facilitate manufacturing the frame by low-cost injection molding and to achieve the other objects of the invention. Other divisions of the frame 100 into a different set of elements would be considered to comprehended within the scope of the invention. For example, top tube 101 could be divided into three or four partial shells instead of just two as shown and described.

b. A Wheelchair Frame

Figure 11:
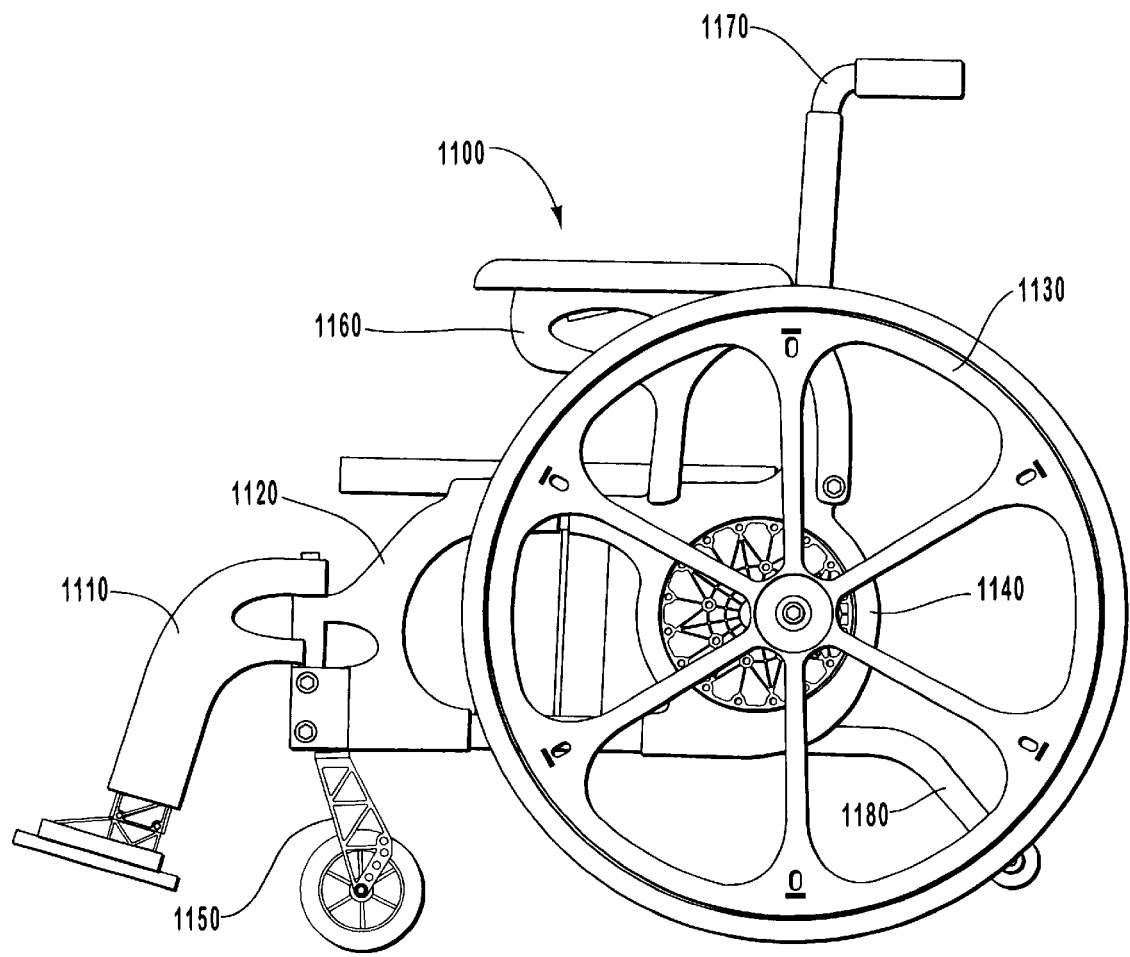
FIG. 11 depicts a side view of one preferred embodiment of a wheelchair frame constructed using the invented frame structure.

FIG. 11 shows an assembled wheelchair frame 1100 using the invented frame structure. The frame comprises the following elements: left and right foot supports 1110, left and right forward frame components 1120, left and right wheels 1130, left and right rear frame components 1140, front wheel supports 1150, left and right handrail supports 1160, back support 1170 and anti-tip components 1180. The existence and general arrangement of these elements is known in the art and is not considered to be the invention. The invention is expressed in the particular structural characteristics of these elements and the method for making a wheelchair frame and components to provide those characteristics. It is, therefore, within the scope of the invention to manufacture any of these elements, or parts of any of these elements, from the invented hollow shell frame.

Figure 12:
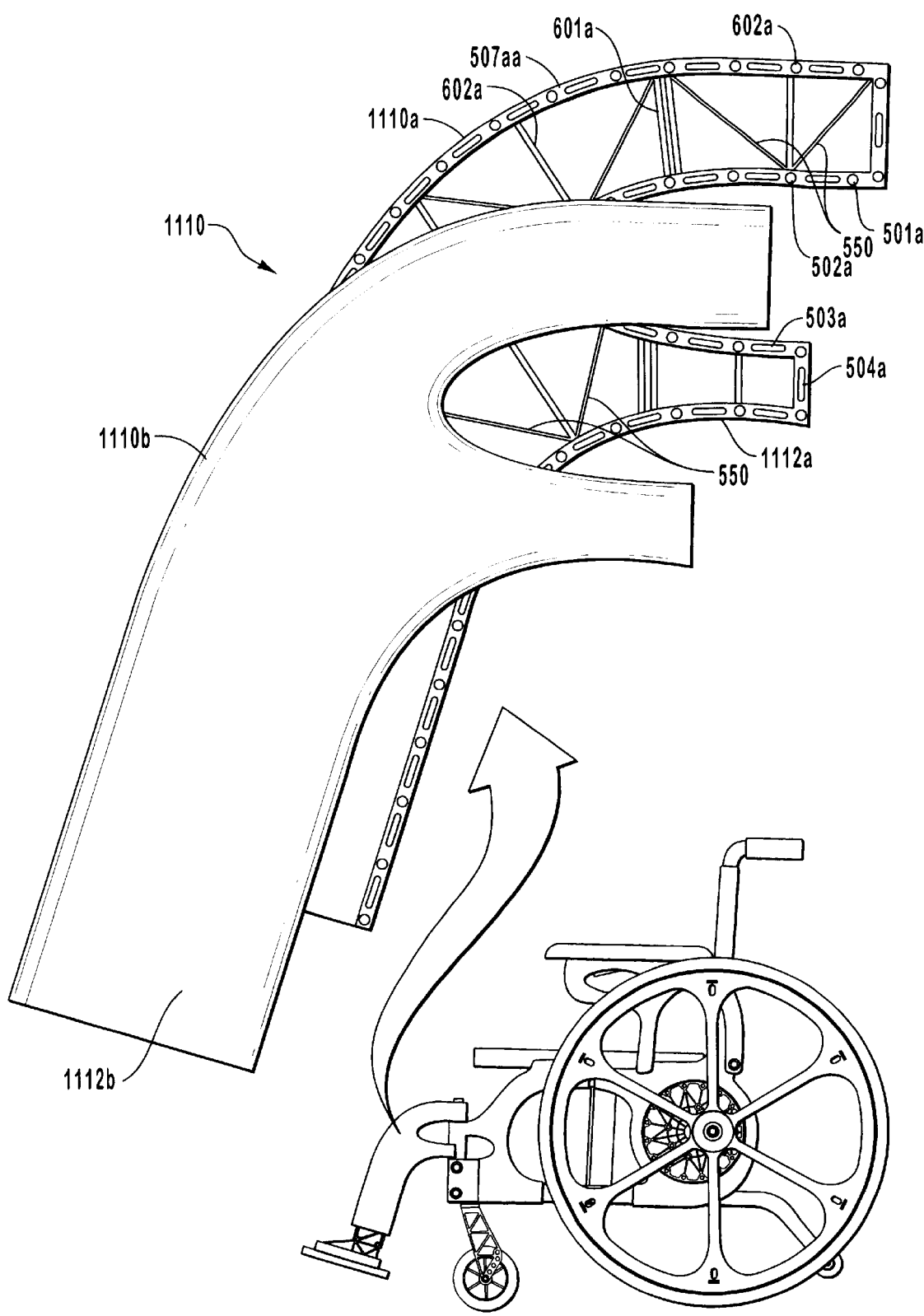
FIG. 12 depicts an exploded (unassembled) view of one embodiment of a wheelchair foot support constructed using the invented frame structure.
Figure 13:
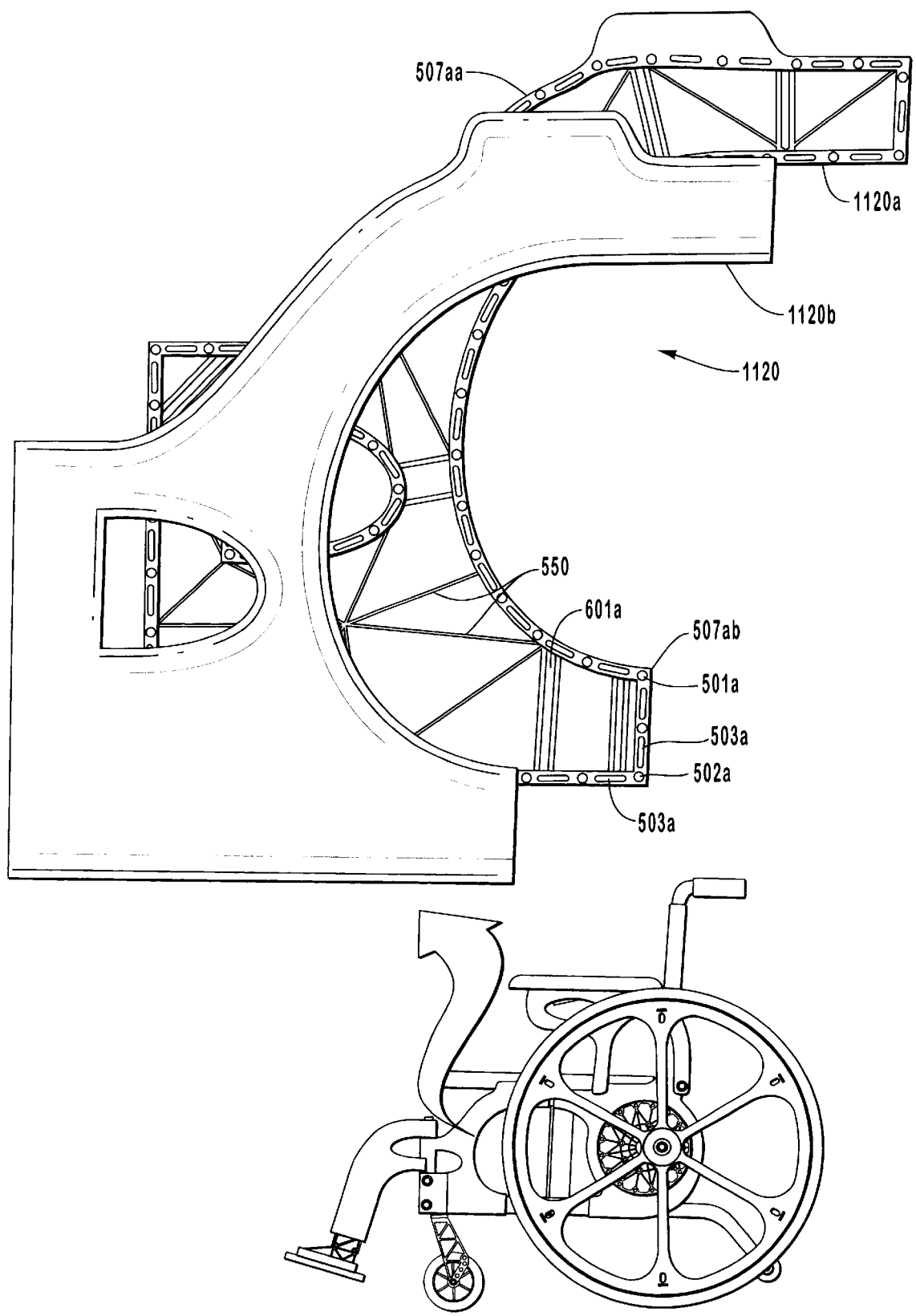
FIG. 13 depicts an exploded (unassembled) view of one embodiment of a wheelchair forward frame component constructed using the invented frame structure.
Figure 14:
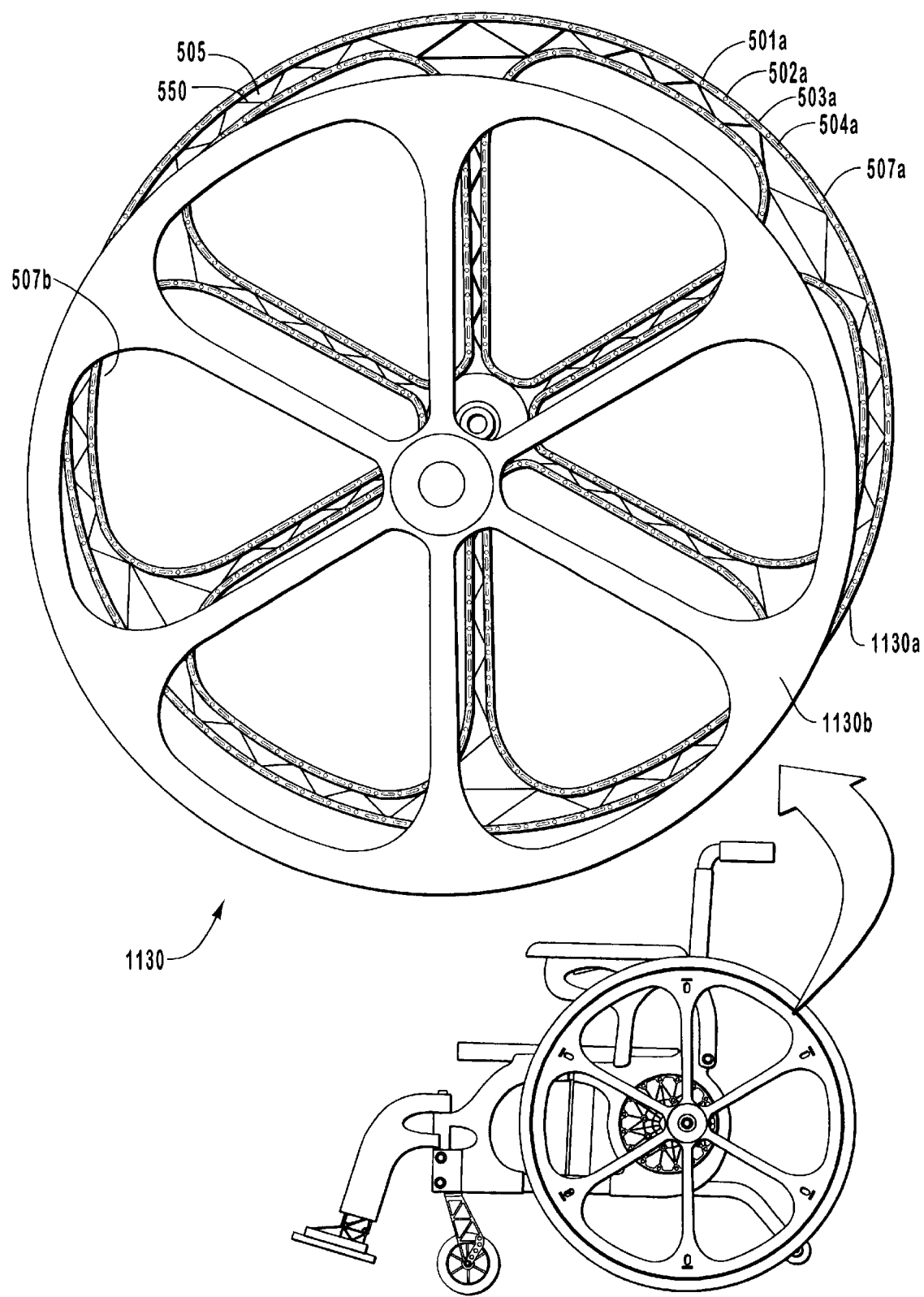
FIG. 14 depicts an exploded (unassembled) view of one embodiment of a wheel (in this drawing a wheelchair mag wheel) constructed using the invented frame structure.
Figure 15:
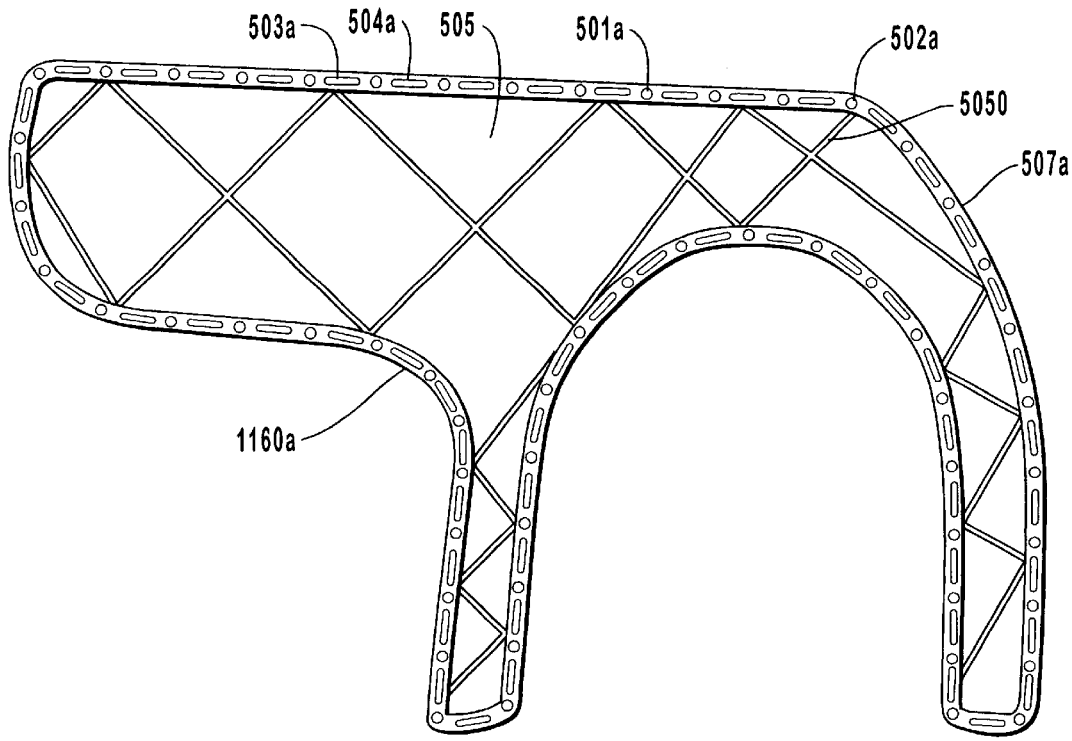
FIG. 15 depicts a side view of one embodiment of a wheelchair handrail support constructed using the invented frame structure.
Figure 16:
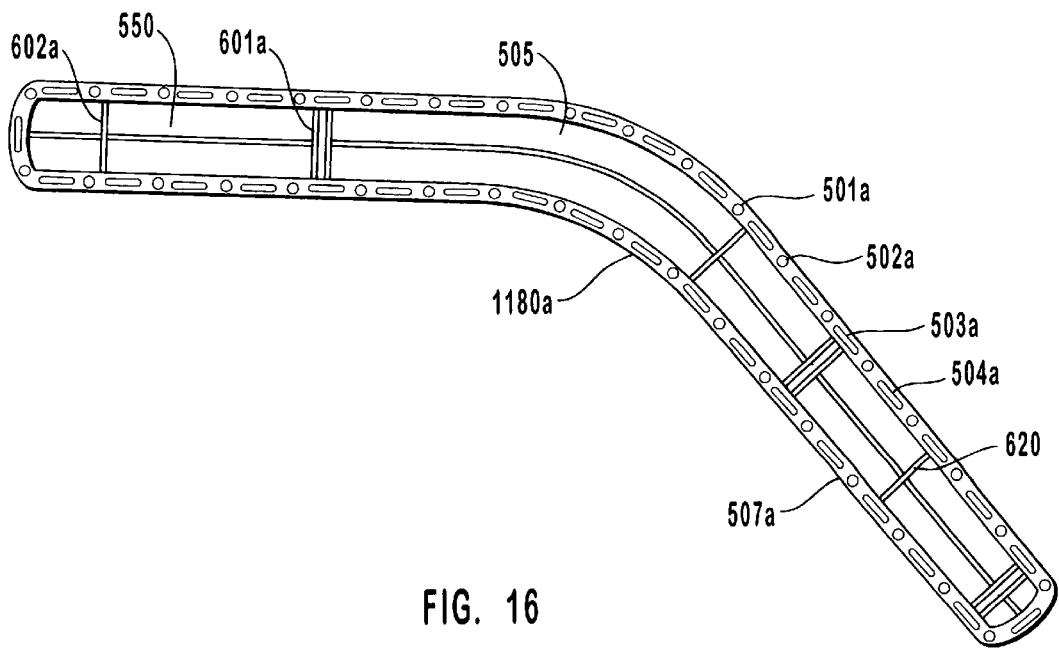
FIG. 16 depicts a side view of one embodiment of a wheelchair rear anti-tip component constructed using the invented frame structure.
Figure 17:
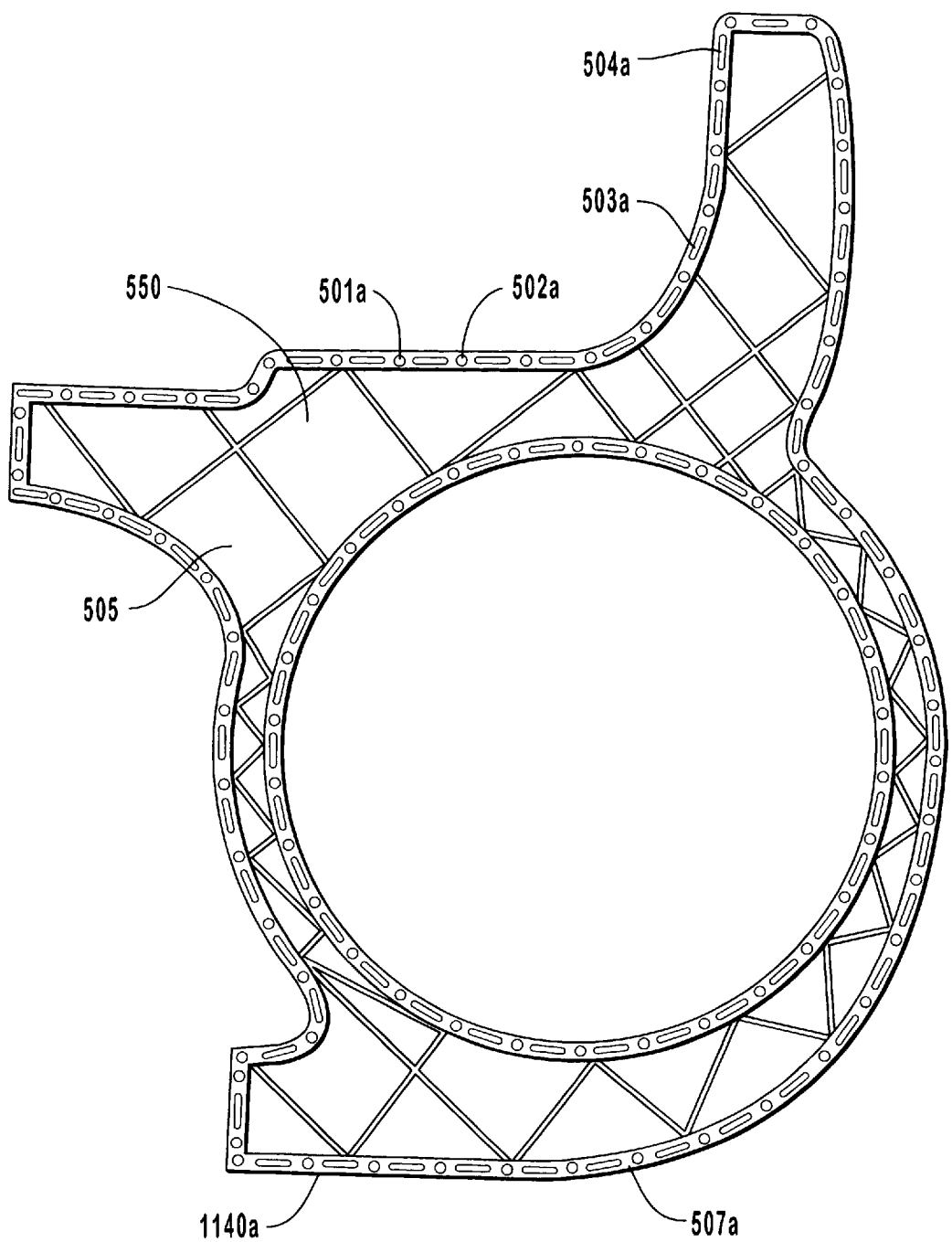
FIG. 17 depicts a side view of one embodiment of a wheelchair rear frame component constructed using the invented frame structure.
Figure 18:
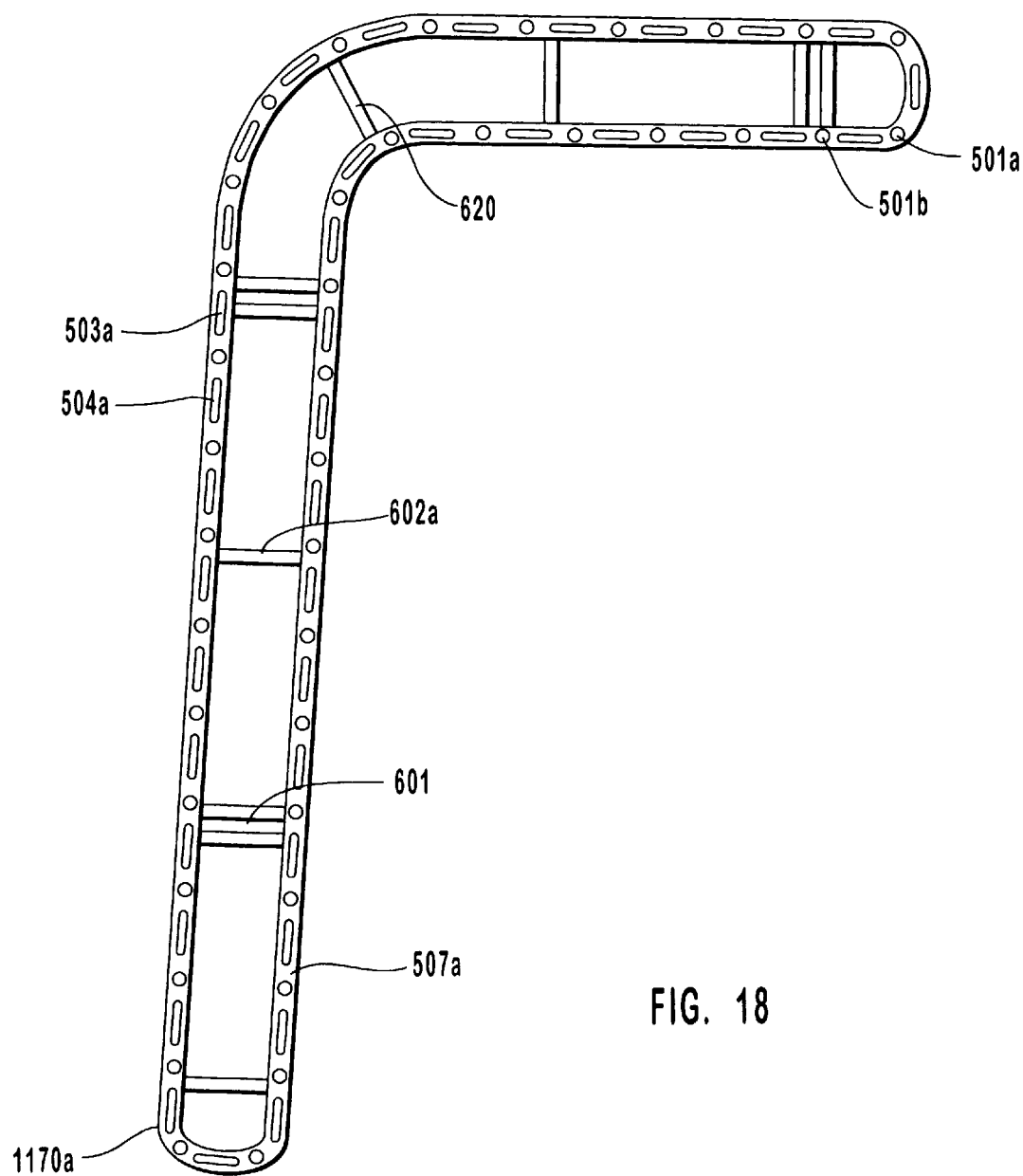
FIG. 18 depicts a side view of one embodiment of a wheelchair back support structure constructed using the invented frame structure.

FIG. 12 shows an exploded (unassembled) side view of foot support 1110. From FIG. 12, it can be seen that the foot support 1110 is constructed from a left main partial shell 1110a and a right main partial shell 1110b. Similarly, as shown in FIGS. 13 and 14, forward frame component 1120 may be constructed from a left partial main shell 1120a and a right partial main shell 1120b, and wheel 1130 may be constructed from a left partial shell 1130a and a right partial shell 1130b. It is within the understanding of those of ordinary skill in the art to similarly construct rear body component 1140, left and right handrail supports 1160, back support 1170 and rear wheel support 1180 using left and right partial shells according to the principles elucidated herein. FIGS. 15–18 show embodiments of partial shells comprising handrail support 1160, rear wheel support 1180, rear fame component 1140 and anti-tip component 1170, respectively. These figures also show various attachment mechanisms, reinforcing ribs and other structural aspects described above and indicated using same reference numerals used when describing the earlier figures.

As described and as shown in FIGS. 11–18, the frame of this preferred embodiment of the invention may be constructed from a number of partial shells. The result is that wheelchair frame 1100 can be manufactured by injection molding separate partial shell components and then assembling the components. The division of the frame 1100 into separate assemblable elements described above and shown in FIGS. 11–18 has been chosen in this preferred embodiment of the invention to facilitate manufacturing the frame by low-cost injection molding and to achieve the other objects of the invention. Other divisions of frame 1100 into a different set of elements would be considered to be within the scope of the invention. For example, wheel 1130 could be divided into three or four partial shells instead of just two as shown and described. Similarly, the shape of any of the elements may be varied according to design specifications or to enhance aesthetic appeal.

C. A Handlebar Frame

Figure 19:
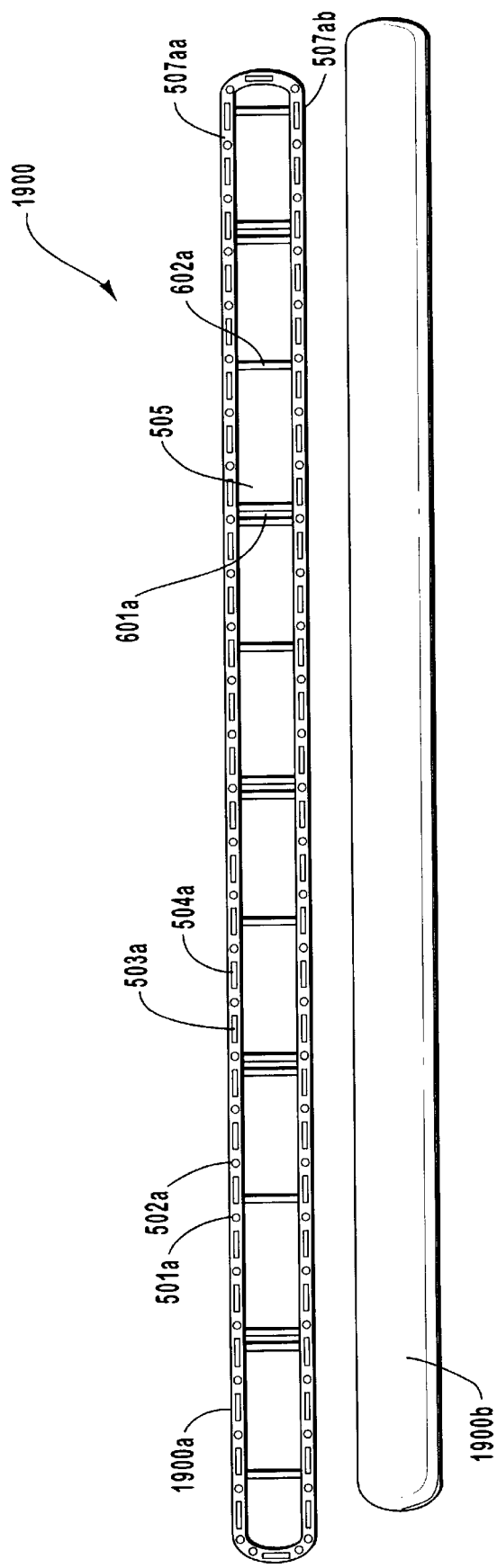
FIG. 19 depicts an exploded (unassembled) view of one embodiment of a handlebar (such as a bicycle, a mountain bike, a motorcycle or an all-terrain vehicle handlebar) constructed using the invented frame structure.
Figure 20:
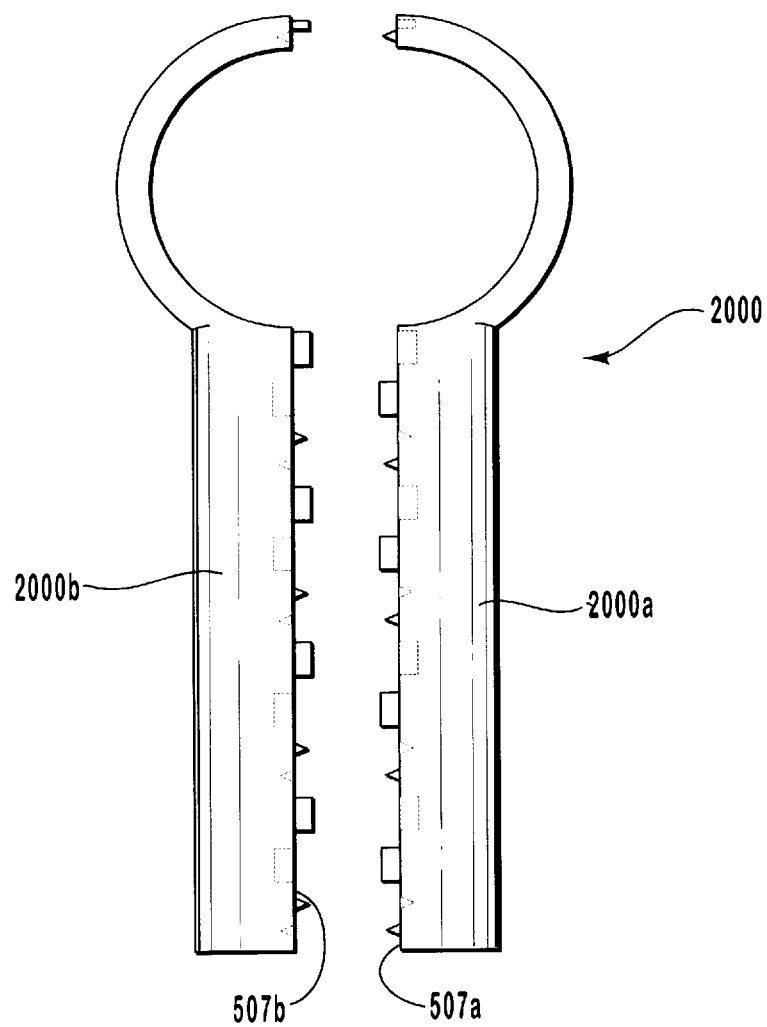
FIG. 20 depicts an exploded (unassembled view) of one embodiment of a handlebar stem (such as for a bicycle, a mountain bike, a motorcycle or an all-terrain vehicle) constructed using the invented frame structure.

FIG. 19 shows an unassembled (exploded) view of one embodiment of handlebar frame 1900 of a preferred embodiment of the invention. FIG. 20 shows an unassembled (exploded) side view of one embodiment of handlebar stem 2000. The existence and general arrangement of these elements is known in the art and is not considered to be the invention. The invention is expressed in the particular structural characteristics of these elements and the method for making a handlebar frame and stem to provide those characteristics. It is, therefore, within the scope of the invention to manufacture any of these elements, or parts of any of these elements, from the invented hollow shell structural frame. From these two figures, the internal structural arrangement of the handlebar can be seen, and the reference numerals for these structural elements are the same as used in preceding figures.

Referring to FIG. 19, it can be seen that handlebar frame 1900 is constructed from a front main partial shell 1900a and a rear main partial shell 1900b. Similarly, as shown in FIG. 20, handlebar stem 2000 may be constructed from a left partial main shell 2000a and a right partial main shell 2000b. It is within the understanding of those of ordinary skill in the art to similarly construct other types of handlebar frames and stems according to the principles elucidated herein.

As described and as shown in FIGS. 19–20, the frame of these preferred embodiments of the invention may be constructed from a number of partial shells. The result is that handlebar frame 1900 and stem 2000 can be manufactured by injection molding separate partial shell components and then assembling the components. The division of the frame 1900 and stem 2000 into separate assemblable elements described above and shown in FIGS. 19 and 20 has been chosen in this preferred embodiment of the invention to facilitate manufacturing the frame by low-cost injection molding and to achieve the other objects of the invention. Other divisions of the frame and stem into a different sets of elements would be considered to be within the scope of the invention. For example, the handlebar frame and stem could be constructed from three or four partial shells instead of just two as shown and described. Alternatively, handlebar frame and stem could be constructed from only two partial shells, each partial shell comprising part of the frame and the tube. The shape of any of the elements may also be varied according to design specifications or to enhance aesthetic requirements.

d. A Bicycle Fork

Figure 21:
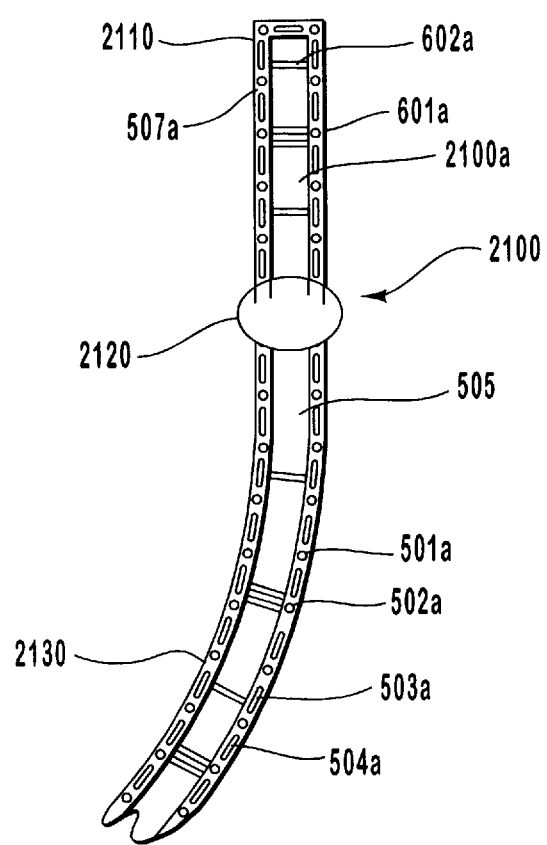
FIG. 21 depicts a side view of one embodiment of a bicycle front fork constructed using the invented frame structure.

FIG. 21 shows a side view of a partial shell of one embodiment of bicycle front fork frame 2100 of the invention. Fork frame 2100 comprises threaded section 2110, bracket 2120 and fork section 2130. The fork may further comprise dropouts, although the dropouts are typically metal and are not a part of this preferred embodiment of the invented frame. The existence and general arrangement of these elements is known in the art and is not considered to be the invention. The invention is expressed in the particular structural characteristics of these elements and the method for making a fork frame providing those characteristics. It is, therefore, within the scope of the invention to manufacture any of these elements, or parts of any of these elements, from the invented hollow shell frame.

Referring to FIG. 21, it can be seen that fork frame 2100 is constructed from a front main partial shell 2100a joined to a similar shell partial shell to form the fork frame (not shown). The two preferred partial shells are joined to that their joining faces meet and any joining elements that they employ, such as protrusions and receptacles, tangs and clevises, screws, bolts or rivets, and adhesive, hold the two partial shells together in a strong and unified frame element. It is within the understanding of those of ordinary skill in the art to similarly construct other types of fork frames according to the principles elucidated herein.

The frame of this preferred embodiment of the invention may be constructed from a number of partial shells. The result is that fork frame 2100 can be manufactured by injection molding separate partial shell components and then assembling the components. The division of the fork frame 2100 into separate assemblable elements described above and shown in FIG. 21 has been chosen in this preferred embodiment of the invention to facilitate manufacturing the frame by low-cost injection molding and to achieve the other objects of the invention. Other divisions of the frame and tube into a different sets of elements would be considered to be within the scope of the invention. For example, the fork frame and tube could be constructed from three or four partial shells instead of just two as shown and described. The shape of any of the elements may also be varied according to design specifications or to enhance aesthetic appeal.

e. The Frame Adapted for Other Vehicles

The frames and frame portions described in the preferred embodiments of the invention may be used in mountain bicycle frames, wheelchair frames, bicycle handlebars, bicycle front forks, wheels for bicycles, wheelchairs and the like, and any other structural component that should be light weight and strong. In other embodiments of the invention, frames could be constructed for road bicycles, hang gliders, sail boards as well as other human-powered vehicles. It would also be possible to use the invention for motorized vehicles, such a mopeds, ultra-light airplanes, motorized wheelchairs, go-carts, automobiles, motorcycles, trucks, trailers, mobile homes, snowmobiles, and others. Frames may also be constructed for parts of human-powered and motorized vehicles.

f. Frames For Other Articles

It is within the scope of the invention to manufacture structural components for all types of light-weight frames. The frames may be molded as two or more partial shells which, when joined together, form an externally complete hollow shell. The existence and general arrangement of these elements is known in the art and is not considered to be the invention. The invention is expressed in the particular structural characteristics of these elements and the method for making the partial shells to provide those characteristics. It is, therefore, within the scope of the invention to manufacture any of these elements, or parts of any of these elements, from the invented hollow shell frame.

It is contemplated that the structural components may be used to construct frames for tennis, squash or racquetball rackets, hiking equipment such as backpack frames, bats, batons, javelins, sleds, and furniture. The principles for making and assembling structural components for light-weight frames will be readily understood by those of ordinary skill in the art according to the principles elucidated herein.

The division of a frame into different sets of elements would be considered to be within the scope of the invention. The shape of any of the elements may also be varied according to design specifications or to enhance aesthetic appeal.

g. The Structural Elements of the Invented Frames

Figure 5:
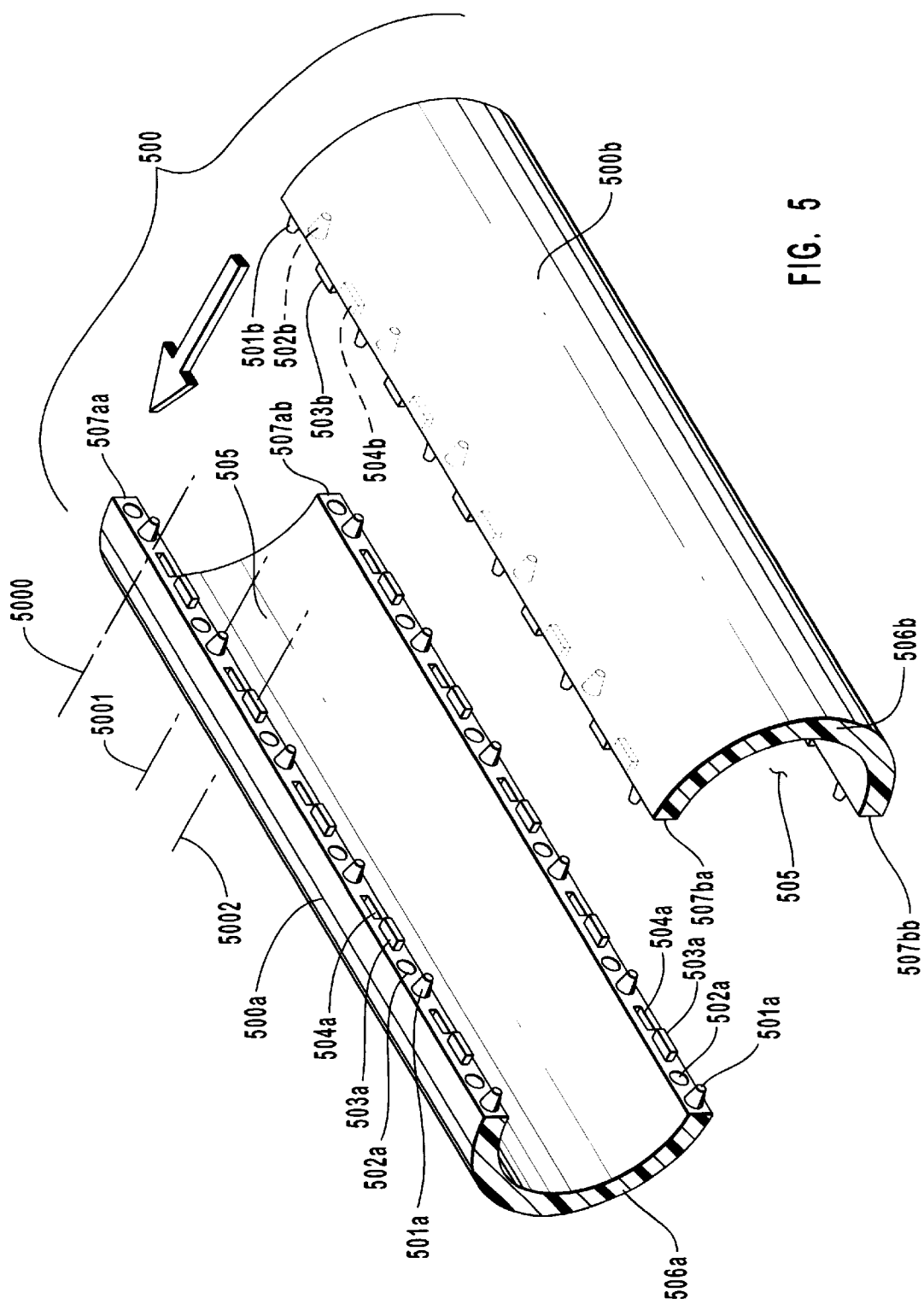
FIG. 5 depicts a side view section of one preferred embodiment a partial (half) shell.

FIG. 5 depicts a perspective view section of one preferred embodiment of a section of a frame shell 500 that includes the invented structure. Shell 500 may be a structural component for any light-weight frame of frame component, and, as presented hereafter, shell 500 is representative of some of the principles of the invention. The shell 500 includes left main partial shell 500*a* and right main partial shell 500*b*. It can be seen from the figure that the shell 500 in this preferred embodiment has a void on its interior 505 or is hollow or has a cavity along its length. The partial shell 500*a* structure is provided by an outer shell skin 506*a* which has a series of protruding cones 501*a*, cone receptacles 502*a*, protruding tabs 503*a* and tab receptacles 504*a* spaced along its length on its shell skin joining faces 507*aa* and 507*ab*. The corresponding partial shell 500*b* structure is provided by an outer shell skin 506*b* which has a series of corresponding cones 501*b*, cone receptacles 502*b*, tabs 503*b* and tab receptacles 504*b* spaced along its length on its shell skin joining faces 507*ba* and 507*bb*. The various cones and receptacles and tabs and receptacles and any other structures accomplishing the same or a similar purpose are referred to in abbreviated fashion as "protrusions and receptacles." When the two partial shells 500*a* and 500*b* are joined, the joining faces 507*aa* and 507*ba* form a seam and joining faces 507*ab* and 507*bb* form a seam. Also depicted in FIG. 5 are the tangent line 5000 to shell 500 (the tangent line 5000 being perpendicular to the longitudinal axis of the shell 500), the center axis 5001 to the cones 501*a*, and the center axis 5002 to the tabs 503*a*. In various embodiments of the invention, the joining faces of the various structural elements of the shell may be situated at different angles to the tangent line 5000. For example, a joining face could be at an angle of about 45 to about 135 degrees to the tangent of the exterior surface of the assembled shell at the point where the joining face and the exterior surface meet. Alternatively, angles in the range of 60 to 120 degrees or 80 to 110 degrees could be used. A plane is formed by the two parallel seams that is called the joining plane. The two partial shell structures 500*a* and 500*b* may be joined by causing the cones 501*a* to enter into and firmly engage with the corresponding cone receptacles 502*b*. Similarly, the cones 501*b* should enter into and firmly engage with the corresponding cone receptacles 502*a*. The tabs function similarly, with tabs 503*a* entering into and firmly engaging with corresponding tab receptacles 504*b*, and tabs 503*b* entering into and firmly engaging with corresponding tab receptacles 504*a*. In the preferred embodiment, the faces of the cones and tabs that will contact corresponding faces of the cone and tab receptacles are constructed so that the cone and tab contact faces are at a slightly greater angle from their center axis than the contact faces of the corresponding receptacles. This causes the cone and tab contact faces to be in firm, pressurized contact with the corresponding contact faces of receptacles, resulting in an assembled component that is tight and solid, with no looseness or rattles. Alternatively, this can be achieved by using an interference fit wherein the protruding object (cone, tab, etc.) is slightly larger in outside dimension than the interior dimension of the corresponding receptacle.

Cones and tabs are used in the preferred embodiment of the invention, although pegs, interlocking pegs, snaps, locking lips or other protrusions for joining two partial shells 500 could also be used. As used herein, the term protrusion includes, but is not limited to, cones, tabs, pegs, interlocking pegs, snaps locking lips or other structure which projects from a joining face surface of a partial shell. The term receptacles, as used herein, includes any aperture for receiving a protrusion. Cones tend to provide equally stiff fastening forces in all directions, while the tabs, as shown, cause the shell to be stiffer in the longitudinal direction (due to their greater length) than in other directions. Therefore a combination of cones and tabs is thought to be most advantageous. In the preferred embodiment, protrusions and receptacles are located on every joining face 507 or edge of each partial shell which is to be assembled with another component.

When the protrusions and receptacles are used as described to assemble a frame, the various partial shells are joined to form complete shells, and the various partial shells are prevented from sliding relative to one another in any direction in the joining plane. The use of protrusions and receptacles also has the advantage of firmly guiding the partial shells together in the precisely correct orientation during assembly, so that a precise match of skin 506 edges is achieved and so that the joining seams are more obscure.

When the two partial shells are joined, they may also be prevented from moving apart orthogonal to the joining plane by using a bonding agent on the contact surface between the two partial shells. A bonding agent may be applied to joining faces 507 and on the protrusions and receptacles. Suitable bonding agents may include, but are not limited to, epoxy, glue, adhesive, welding (such as high frequency plastic welding or friction plastic welding) or other suitable agent which bonds the two partial shells together. The use of a bonding agent applied to the protrusions and receptacles has the advantage of substantially increasing the available bond surface area compared to the bonding area that would be available if flat, protrusion-less joining faces 507 were used; a stronger bond results.

The two partial shells may also be prevented from moving apart orthogonal to the joining plane by using one or more attachment mechanisms to secure the two partial shells. Such an attachment mechanism may include firmly engaging any two assemblable parts of the invention by constructing the corresponding parts with a slight lip on any or all of the protrusions, so that the protrusion must bend slightly when being joined. Thus, at the conclusion of joining the lip snaps over a ledge in the receptacle. The lip and ledge arrangement prevents the disengagement of the protrusion from its receptacle similar to the manner in which the barb on a fish hook causes the hook to resist disengagement from tissue.

Figure 5A:
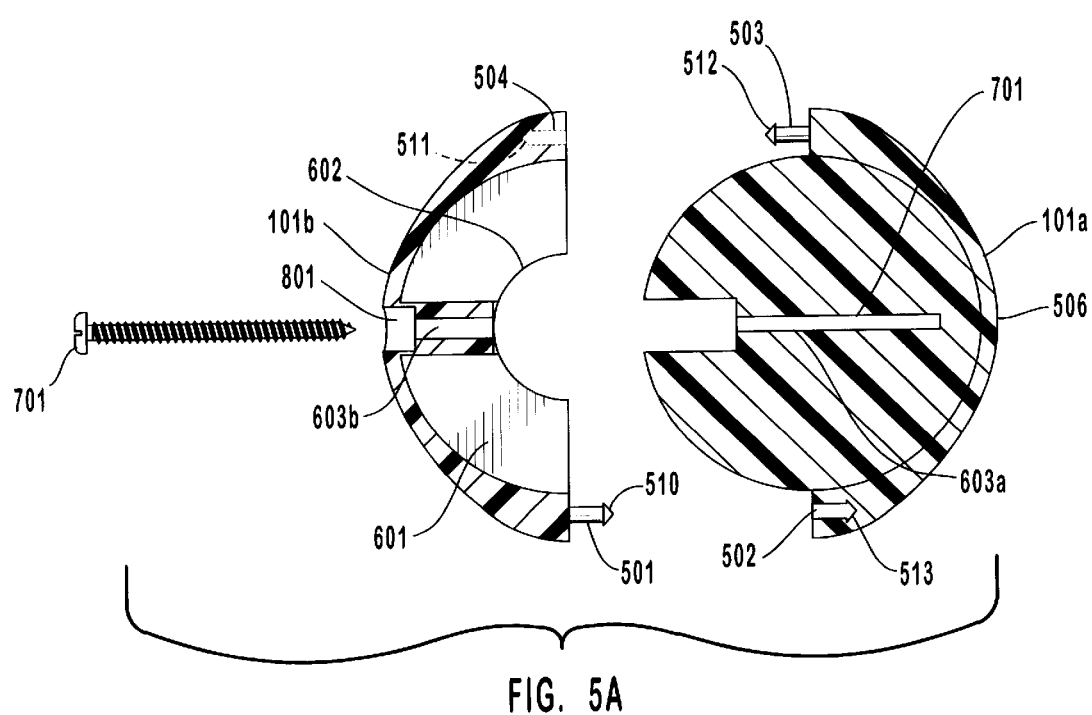
FIG. 5a shows an unassembled cross-section of one embodiment of the invention which has two partial shells with engagement and structural reinforcement features.

FIG. 5*a* shows an unassembled cross-section of one embodiment of two partial shells in which protrusions 501 and 503 each have a lip 510 and 512 respectively, the lips 510 and 512 being engagable with a ledge 513 and 511 respectively. The lip used may be partially or completely disposed around a protrusion. Similarly, the ledge used, which forms part of a wall of a receptacle may be partially or completely disposed around the cavity of a receptacle. Using the above-described structure, the resulting joined shell acts structurally as a single monocoque shell. With such interlocking protrusions and receptacles, it is possible to assemble the frame without the use of a bonding agent on the joining faces or on the protrusions and receptacles.

Placement of the protrusions and receptacles on the shell skin 506*a* results in a higher strength frame structure than would be achieved from placement of the protrusions and receptacles on the interior 505 of the partial shell 500*a*. As the distance of the paired protrusions and receptacles (or attachment mechanisms) from the center of the shell increases, the ability of the shell to withstand torque (i.e. torsional loading) is increased. However, protrusions and receptacles may be placed at any convenient location within the shell structure.

Figure 6:
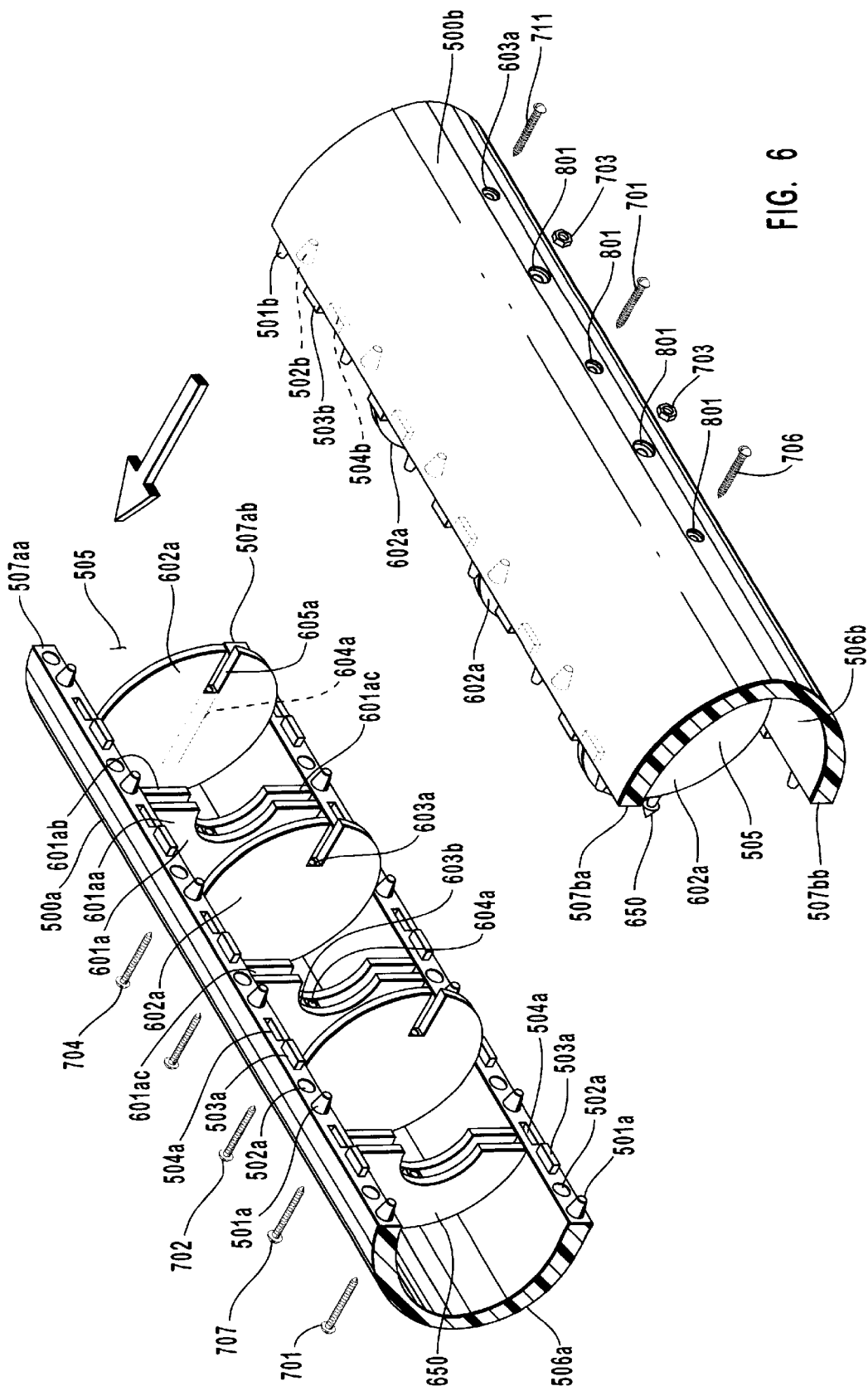
FIG. 6 depicts a section of another preferred embodiment a partial (half) shell which uses protrusions and receptacles and tangs and devises as well as various fasteners.

FIG. 6 depicts another preferred embodiment of the invention that, compared to the embodiment of FIG. 5, can be used to achieve an assembled component with even greater resistance to sliding movement in the joining plane and even greater resistance to the pulling apart of the partial shells orthogonal to the joining plane. FIG. 6 shows protrusions and receptacles within the interior 505 hollow of the shell. In the embodiment shown, the protrusions and receptacles include tang 602 and clevis 601. The protrusions and receptacles in the interior of the shell and those on the joining faces of the shells could be any type of protrusion and receptacle, however, such as cones, tabs, pegs, snaps, and others. While the tang shown in the figure protrudes from the interior of the half shell beyond the joining plane, it may be desired to use protrusions that do not extend beyond the joining plane.

Figure 5B:
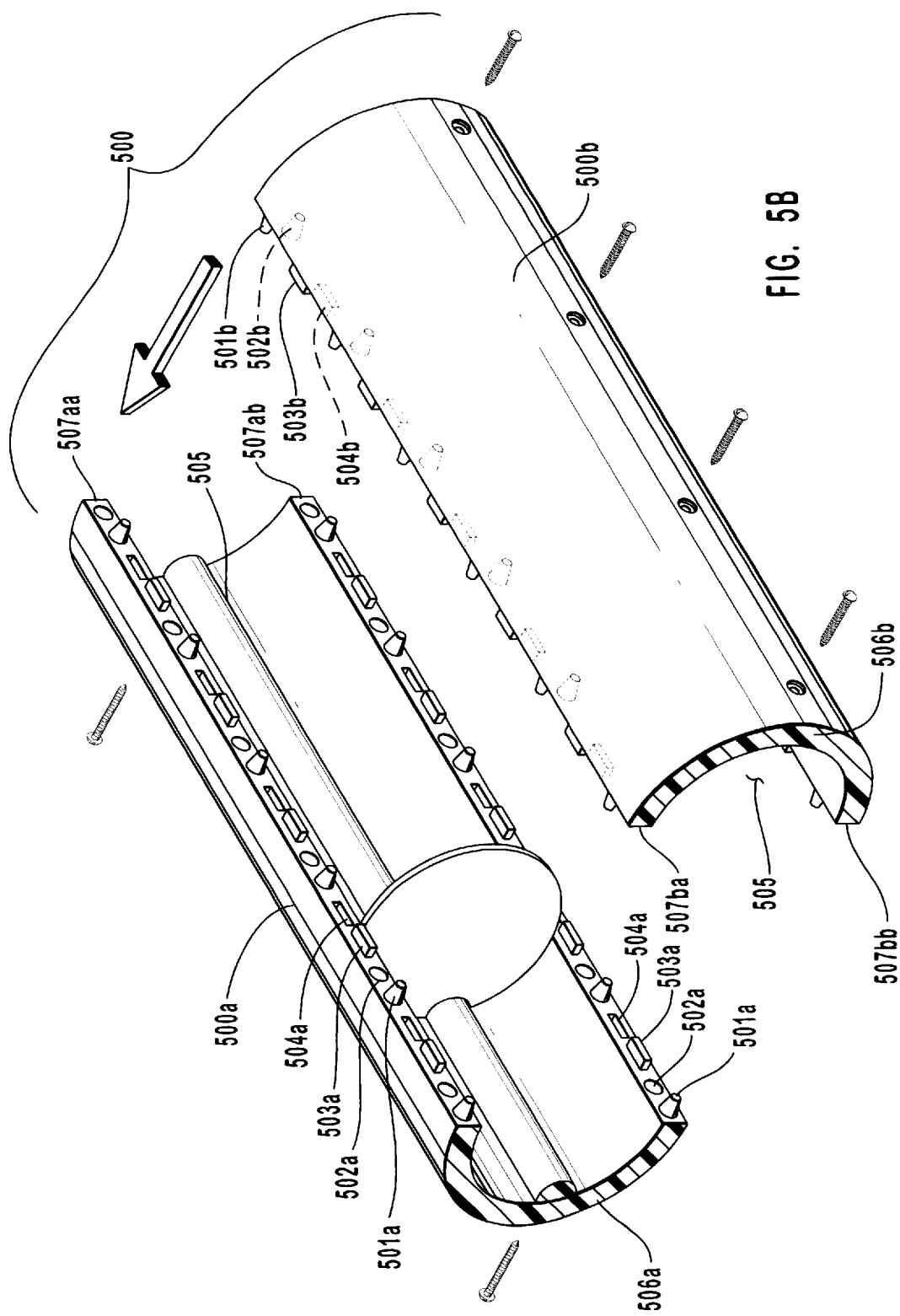
FIG. 5b shows an unassembled perspective view of one embodiment of the invention in which protrusions, receptacles, and a reinforcing rib without a corresponding receptacle are used.

Referring to FIG. 6, the tang 602a of one partial shell 500a fits into a clevis on the interior surface of the corresponding partial shell 500b. The clevis on the interior surface of the corresponding partial shell 500b would be of similar structure to the clevis 690 shown. The tang 602a used is a circular shell molded into the shell wall 506a of one partial shell 500a, the circular shell occupying substantially the entire diameter of the interior of the shell 505. The clevis 601a used is a two-part clevis with a proximal wall 601aa and a distal wall 601ab, the proximal and distal walls 601aa and 601ab being spaced and adapted to receive a tang 602b into their interstitial space 601ac and hold the tang 602b firmly therein. Referring to FIG. 5b, it is also within the scope of the invention to include a protrusion such as reinforcing rib 620 without a corresponding receptacle. The location and spacing of paired tangs and clevis's, or of reinforcing ribs, may be varied to increase or decrease the strength and stiffness of an assembled shell in accordance with a particular design need. A bonding agent may be used on the contact surface between tang and clevis to reinforce any frictional engagement therebetween. The interlock between tang and clevis further prevents sliding in any direction of the joining plane, and provides additional bond area for preventing pulling apart of the two partial shells orthogonal to the joining plane.

FIG. 6 also shows that other attachment mechanisms may be used to attach the two partial shells 500a and 500b. Each tang 602a may include an attachment boss 604a that has an attachment hole 603a. A corresponding attachment hole is found on the clevis 603b in the area of a clevis wall anchor 604a. The clevis wall anchor 604a provides reinforcement between clevis walls 601aa and 601ab. A corresponding clevis-wall-anchor-gap 605a is provided on each tang 602 to accommodate the geometry of the clevis 601 and clevis wall anchor 604. When an attachment boss is used, it is expected that the shell skin may be thickened to form the rim of the attachment boss to increase its strength and to cause it to have greater durability under torque or other forces. Attachment mechanisms or fasteners that may be used include, but are not limited to bolts, rivets, screws, pins, and nails that extend from one partial shell 500a into another through attachment holes 603a and 603b to mount into attachment boss 604a. Attachment mechanisms may also include clips. As used herein, the term "clips" refers to a mechanism where a protruding shell from one side snaps into a protruding shell of another side. Referring to FIG. 6, clip and receptacle 650 may comprise a portion of a tang and clevis or may be present on the outer surface of a tang or clevis.

In the embodiment of the invention shown in FIG. 6, screw 701 is used as the attachment mechanism that fits through attachment hole 603b in the clevis 601, then through attachment hole 603a in the tang 602 so that it can self-tap into the attachment boss 604a. The screw is inserted in the exterior of the shell wall 506a, and is prevented from going through the clevis by the use of a screw head that is larger than the attachment hole 603b in the clevis. This is illustrated further in FIGS. 7–10.

FIG. 6 also illustrates other attachment mechanisms which may be used to secure the two partial shells. A bolt 702 may be inserted through attachment holes 603a and 603b where nut 703 engages the bolt. A rivet 704 may also be inserted through attachment holes 603a and 603b where it engages rivet head 705. A bolt 706 and threaded receptacle 707 may also be used as an attachment mechanism. In the preferred embodiment of the invention, the end(s) of an attachment mechanism may be recessed within countersink hole 801 to provide a smooth appearance to outer skin 506a. A nail or pin 711 may also be used to secure the partial shells by a friction fit. If desired, a nail or pin may be used in combination with an attachment holes 603a and/or 603b. In one embodiment of the invention, an attachment boss 604a may be used in combination with a nail or pin. A bonding agent may also be used with any attachment mechanism to further enhance the ability of the attachment mechanism to secure the partial shells. A bonding agent may be applied to the attachment mechanism, may be introduced into an attachment hole 603a or 603b, may be applied to countersink hole 801, or may be applied to joining faces 507 and on the protrusions and receptacles of the partial shells.

Referring to FIG. 5b, a longitudinal reinforcing rib 550 may be placed on the interior 505 of the partial shell. The reinforcing rib 550 would typically be placed equidistant from the joining faces 507aa and 507ab on the interior 505 of the shell, although other locations of a rib are within the scope of the invention. A rib may run from clevis 601a to tang 602a, typically along the entire length of the shell wall 506a. The purpose of the reinforcing rib would be to increase the stiffness of the partial shell 500a in its longitudinal direction so that it would have less tendency to flex during assembly. This would permit greater spacing of tang and clevis along the shell wall and greater spacing of the cones and tabs on the joining faces, while still achieving partial shells that are easy to assemble. Alternatively, reinforcing ribs can be put anywhere and in any orientation in the interior 505 to increase strength and stiffness to meet a particular design need.

An attachment mechanism such as screw 701 may be used independently of a paired internal protrusion and receptacle. Screw 701 may be inserted through attachment hole 603b into rib 620 so that the screw can self-tap into the attachment boss 604a in rib 620. The screw is inserted through the exterior of the shell wall 506a, and is prevented from going through the partial shell wall by the use of a screw head that is larger than the attachment hole 603b in the wall. A screw 701 may also secure the partial shells without the use of a fastener boss by self-tapping directly into a rib 620. Alternately, a guide hole in the rib may facilitate attachment of the screw to the rib.

An attachment mechanism may also be used to connect two partial shells without an intervening protrusion, receptacle or rib. Referring to FIG. 5b, for example, bolt 702 may be inserted through an attachment hole. Nut 703 engages the end of bolt 702. A rivet 704 may also be inserted through attachment holes where it engages rivet head 705. A bolt 706 and threaded receptacle 707 may also be used as an attachment mechanism. In a preferred embodiment of the invention, the end(s) of an attachment mechanism may be recessed within countersink hole 801 to provide a smooth appearance to outer skin 506*a*. A nail or pin 711 may also be used to secure the partial shells by a friction fit. If desired, a nail or pin may be used in combination with an attachment hole 603*a* and/or 603*b*. In one embodiment of the invention, an attachment boss 604*a* may be used in combination with a nail or pin.

It is also contemplated that an attachment mechanism may be used in combination with a paired protrusion/receptacle combination. Such an attachment mechanism may include, but is not limited to, a screw, bolt and nut, nail, pin or rivet. As discussed previously, such an attachment mechanism may further include a clip or snap.

It is within the scope of the invention to use a bonding agent with any attachment mechanism to further enhance the ability of the attachment mechanism to secure the partial shells. A bonding agent may be applied to the attachment mechanism, may be introduced into an attachment hole 603*a* or 603*b*, may be applied to countersink hole 801, or may be applied to joining faces 507 and on the protrusions and receptacles for partial shells.

Figure 7:
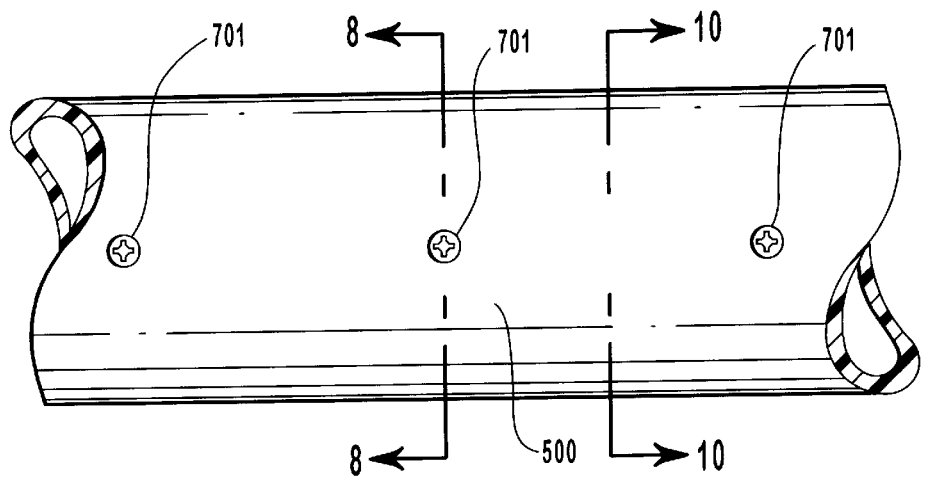
FIG. 7 depicts a side view of another preferred embodiment of the partial (half) shell.
Figure 8:
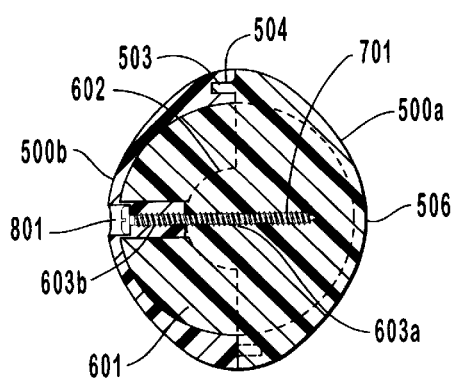
FIG. 8 depicts a cross section at 8—8 (assembled) of the embodiment of the partial (half) shell depicted in FIG. 7.
Figure 10:
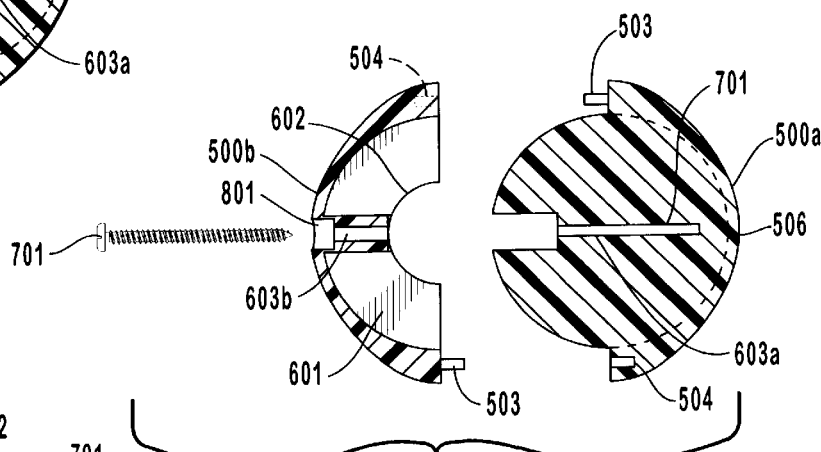
FIG. 10 depicts a cross section at 8—8 (assembled) of the embodiment of the partial (half) shell depicted in FIGS. 7–9.
Figure 9:
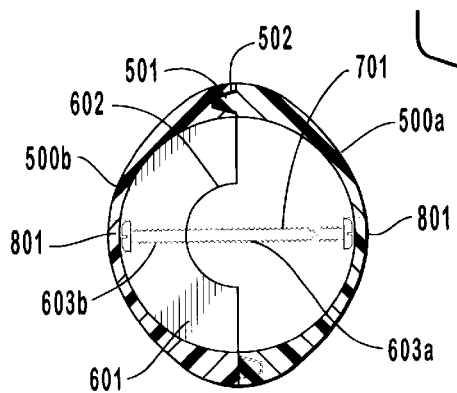
FIG. 9 depicts a cross section at 10—10 (before assembly) of the embodiment of the partial (half) shell depicted in FIGS. 7 and 8.

FIG. 7 shows a side view of the shell 500. Screw heads 701 of screws that are serving as attachment mechanisms are visible. FIG. 8 shows a cross section of shell 500 at section 8—8, of FIG. 7, when assembled. Note that FIG. 8 reveals shell 500 to be oval in cross section because the shell wall 506 is thicker in the area of the tabs 503 and cones 501. In alternative embodiments, any of the shells of a frame could be round, oval, egg-shaped, tear-drop shaped, square, polygonal (e.g. hexagonal, octagonal, pentagonal) or otherwise in cross section, depending on the characteristics of the shell desired. In FIG. 8, it can be seen how the tang 602 and clevis arrangement joins together. Joining of the tab 503 and tab receptacles 504 is also shown. Screw 701 is shown reinforcing joining of the two partial shells 500*a* and 500*b*. A countersink 801 is provided so that the head of the screw 701 can be partially hidden from view. FIG. 10 shows the elements of FIG. 8 prior to assembly. FIG. 9 shows a cross section of the shell 500 at section 10—10 of FIG. 7.

As can be seen from the drawings and accompanying description, the invention provides a frame constructed from a number of partial shells which, when joined together, behave as a complete single shell (i.e. a monocoque shell). The number of partial shells comprising a particular embodiment of the invention may vary according to the design requirements. The partial shells of the monocoque shell resist sliding and movement in any direction along their joining plane. The partial shells also resist pulling or splitting apart from each other in a direction orthogonal to the joining plane of the seam. This combination eliminates all degrees of freedom of the partial shells with respect to one another, forcing them to behave as though they were a single integrated piece with no seam or separate assembled components.

h. Method for Making the Frame

In one preferred embodiment, the frame comprises a plurality of partial shells which are injection molded and then joined with a bonding agent on the protrusions, receptacles and joining faces to achieve the invented frame. In another preferred embodiment of the invention, the frame comprises a plurality of partial shells which are injection molded and then joined by using at least one attachment mechanism. Such a frame may be further joined using a bonding agent. In the preferred embodiment, the partial shells will be molded from a composite material which will typically be a combination of structural fiber (glass, carbon, aramid, etc.) and a structural plastic (such as polyamide, polyphenylene sulfide, high density polyethylene, polypropylene, polyester (polyethylene terephthalate), acrylonitrile butadiene styrene, polycarbonate, etc.). In the most preferred embodiment of the invention, the plastic is a thermoplastic material. In the preferred embodiment, standard modulus moderate strength graphite (carbon) fiber known as TORAY T-700 graphite and NYLON 6-6 thermoplastic are used. Other fibers and thermoplastics which are available commercially could be used as well. The partial shells could also be manufactured from thermoplastic without reinforcing fibers, injectable metals, injectable quick-setting fiber-reinforced thermoset plastics, or any other injectable, quickly solidifying structural material. A particular advantage of the material used in the preferred embodiment is that it results in a frame that inherently dampens shock and thus provides a comfortable ride to the rider. Injection molding in the preferred embodiment takes place at 10,000 to 30,000 pounds per square inch of pressure so that no voids will result in the molded component. This is an important advance over prior art low-pressure molding, such as the inflation-cured shells described earlier, because the voids left with low-pressure molding resulted in unpredictably weak components and component failure. On a vehicle that undergoes rigorous use, such a mountain bike, unpredictable failure can be dangerous.

The general steps of the process include procuring a mold shaped to mold a component with the desired structural characteristics (such as those described above), injecting a molten fiber-reinforced thermoplastic into the mold under a pressure of 10,000 to 30,000 p.s.i. to cause the thermoplastic to fill the entire cavity of the mold, allowing the plastic to cool and thus solidify, separating the two mold halves from each other so that the molded component may be removed from the mold, and joining together a plurality of such molded components into a vehicle frame, using a bonding agent and/or at least one attachment mechanism to hold the molded components together as a unit, resulting in a frame that behaves as a monocoque frame. Finishing steps may be employed as well, such as sanding, painting, attachment of decals, etc.

i. Some Advantages of the Frame Over the Prior Art

The preferred embodiments of the invention described above illustrate how the invention achieves the object of the invention and how the invention is advantageous over the prior art.

The invented method for manufacturing a light-weight frame for a human-powered vehicle can be used to produce large quantities of frames rapidly at a very low cost. Injection molding is well known in the art as a very low labor and low cost process. Partial shells that make up the invented frame can be injection molded by a single laborer at the rate of approximately one per minute. Labor costs to assemble the partial shells into a frame are minimal because the protrusions act as a firm guide in precisely aligning the partial shells for quick, foolproof assembly. This reduces labor costs substantially over prior art methods. Minor clamping pressure, or the pressure caused by an attachment mechanism (i.e. screws, bolts, etc.), is adequate to hold the partial shells precisely aligned together in correct position during curing of a bonding agent without the need for expensive jigs or other fixturing. The cost of fiber-filled structural thermoplastic injection moldable materials used in the invention is generally less than the cost of fiber/thermoset-resin composite materials, and compares favorably with metal alloys commonly currently used in light-weight human-powered vehicle frames (such as in bicycles and wheelchairs). The extremely low labor cost, combined with the favorable material costs, results in a low cost frame.

The invented frame also has definite weight advantages over prior art frames. At the angles and bends of the invented frame, the injection moldable fiber-reinforced plastic material flows around without discontinuity such as is found in the joints of a welded-tube or tube-and-lug frame. Thus additional, heavy build-up is unnecessary at the angles and bends of the invented frame. And unlike inflation-cured shells, there is no excess build-up of materials at the angles and bends. The injection molding art is well known to be able to control part thickness such that every area of the frame can have the optimum design thickness for its required strength characteristics, but without any excess, thus saving weight.

The invented frame also results in an aesthetically attractive frame. The completed assembled frame of the invention can be designed to have the same attractive appearance (i.e. free flowing lines) as the heavier, more expensive inflation-cured monocoque shell frames. Various shapes for the frame shell of the invented frame can be chosen as well, whether for appearance or aerodynamic considerations.

The invented frame is also free of exposed edges, areas which trap dirt, mud, and debris, and it is easy to clean. The closed and complete shell of the invention adds torsional strength and stiffness over prior art designs. Unlike the similarly light and inexpensive truss structure frames, the invented frame uses partial shells which are joined in such a fashion that a complete shell without unprotected openings results. The frame has no exposed thin edges for greater damage resistance, and no areas which tend to trap dirt, mud, and debris, and thus cleaning the frame is easy.

The invented frame characteristics and manufacturing process can be used to manufacture principle structural shells of lightweight vehicles other than the frame. For example, a bicycle handlebar can be made from two half shells of the invention which join to make a resulting tubular handlebar. A rigid wheel can be made from a right half shell and a left half shell which join to form a wheel complete with tire rim. Any other structural shells of lightweight human-powered vehicles which are otherwise made by the three prior art methods mentioned above (i.e. (1) joined tubing, (2) inflation cured shells, and (3) truss structures) can be made once the invention is known. For example, the characteristics of the invention can be employed to manufacture wheelchair foot rests, wheelchair back rests, wheelchair side frames, hang glider wing frames, and others.

Although the preferred embodiments described above utilize structurally complete shells that have smooth exteriors without exposed openings, not every portion of the invented frame need be joined into a complete shell to be considered within the scope of the invention, as long as some portions of the frame are complete. For example, in FIG. 3, the bicycle would be functional with just the left and right main shells joined, and the four inner seat and chain stays omitted. The four inner seat and chain stays are preferred for an attractive appearance, added structural strength, elimination of sharp edges, avoidance of trapped mud, etc. Another example is handlebars. Handlebars made with the characteristics of the invention could be open at their ends, thus not being a completely closed shell.

While the present invention has been described and illustrated in conjunction with a number of specific embodiments, those skilled in the art will appreciate that variations and modifications may be made without departing from the principles of the invention as herein illustrated, described and claimed.

The invention may be embodied in other specific forms without departing from the spirit or essential characteristics thereof. The present embodiments are to be considered in all respects as illustrative, and not restrictive. The scope of the invention, is therefore, indicated by the appended claims rather than by the foregoing description, and all changes which come within the meaning and range of equivalency of the claims are to be embraced within their scope.

We claim:

1. A lightweight structural component for a human-powered vehicle, the structural component comprising:
    a first partial shell, said first partial shell having a proximal side and a distal surface,
    a second partial shell, said second partial shell having a proximal side and a distal surface,
    said first and second partial shells being joined to form an assembled shell, an outer tube skin on said distal surface of each of said partial shells, said outer tube skins forming an exterior surface of the assembled shell,
    an interior cavity located on the proximal side of each partial shell, said interior cavities each having a volume that includes a hollow portion,
    a first joining face located along the length of said first partial shell,
    a second joining face located along the length of said second partial shell, said first joining face of said first partial shell being in firm contact with said first joining face of said second partial shell in the assembled shell, said second joining face of said first partial shell being in firm contact with said second joining face of said second partial shell in the assembled shell,
    a protrusion located in a joining face of said first partial shell,
    a receptacle located on a joining face of said second partial shell and
    a reinforcing rib located on the proximal side of one of said partial shells said reinforcing rib being adapted to provide structural strength to said assembled shell;
    wherein said assembled shell has a first seam where said first joining face of said first partial shell meets said first joining face of said second partial shell;
    wherein said assembled shell has a second seam where said second joining face of said first partial shell meets said second joining face of said second partial shell;
    wherein said first seam and said second seam define a plane referred to as the joining plane;
    wherein in said assembled shell, said protrusion protrudes into said receptacle;
    wherein said protrusion protruding into said receptacle impedes movement of said first partial shell with respect to said second partial shell in the joining plane;
    wherein said structural component is manufactured from a fiber-reinforced thermoplastic material.

2. A structural component as recited in claim 1 further comprising an attachment mechanism adapted to keep said first and second partial shells firmly engaged with each other in the assembled shell and to prevent movement of said first partial shell with respect to said second partial shell in a direction generally orthogonal to the joining plane.

3. A structural component as recited in claim 2 wherein said attachment mechanism is selected from the group consisting of bolts, rivets, screws, pins, and nails.

4. A structural component as recited in claim 1 wherein said protrusion and said receptacle have a bonding agent on their surfaces to keep said first and second partial shells firmly engaged with each other in the assembled shell and to prevent movement of said first partial shell with respect to said second partial shell in a direction generally orthogonal to the joining plane.

5. A structural component as recited in claim 1 further comprising a bonding agent on at least one of said joining faces of said first and second partial shells;

wherein said bonding agent is adapted to keep said first and second partial shells firmly engaged with each other in the assembled shell and to prevent movement of said first partial shell with respect to said second partial shell in a direction generally orthogonal to the joining plane.

6. A structural component as recited in claim 1 wherein said partial shells are joined into an assembled tube by joining means selected from the group consisting of adhesive, fasteners and welding.

7. A structural component as recited in claim 1 further comprising a second protrusion and a second receptacle wherein said second protrusion is located in the interior cavity of said first partial shell and said second receptacle is located within the interior cavity of said second partial shell.

8. A structural component as recited in claim 7 wherein said second protrusion is a tang located on the interior surface of said first partial shell; wherein said second receptacle is a clevis located on the interior surface of said second partial shell, said tang being adapted to receive and firmly engage with said clevis in the assembled shell.

9. A structural component as recited in claim 8 wherein said tang comprises a plate; wherein said clevis comprises two generally parallel plates with a gap between them, said gap being of a dimension so that said tang can be inserted into said gap; and wherein said parallel plates are configured to firmly engage with said tang to impede movement of said first partial shell with respect to said second partial shell in the joining plane.

10. A structural component as recited in claim 1 further comprising an attachment boss on said first partial shell, said attachment boss being a hole through which an attachment mechanism may protrude and a rim of material around said hole that is thicker than material in another location on said outer skin.

11. A structural component as recited in claim 1 wherein said first and second partial shells are welded together in the assembled tube.

12. A structural component as recited in claim 1 further comprising:

a hole through said protrusion on said first partial shell, said hole being of a dimension and orientation to accommodate the projection of an attachment mechanism therethrough, and a hole in said second partial shell opposite said hole on said first partial shell in the assembled tube, said hole in said second partial shell being of a dimension and orientation to receive an attachment mechanism projecting through said hole through said protrusion in said first partial shell so that an attachment mechanism may be inserted through said holes in order to firmly join said first partial shell with said second partial shell in order to form an assembled shell.

13. A lightweight structural component for a human-powered vehicle, the structural component comprising:

a first partial shell, said first partial shell having a proximal side and a distal surface, a second partial shell, said second partial shell having a proximal side and a distal surface, said first and second partial shells being joined to form an assembled shell, an outer skin on said distal surface of each of said partial shells, said outer skins forming an exterior surface of the assembled shell, an interior cavity located within said assembled tube, said interior cavity having a portion that is hollow, a first joining face located along the length of said first partial shell, a second joining face located along the length of said first partial shell, a first joining face located along the length of said second partial shell, a second joining face located along the length of said second partial shell, said first joining face of said first partial shell being in firm contact with said first joining face of said second partial shell in the assembled shell, said second joining face of said first partial shell being in firm contact with said second joining face of said second partial shell in the assembled shell, a reinforcing rib located on the proximal side of one of said partial shells, said reinforcing rib being adapted to provide structural strength to said assembled shell, and a protrusion located on said first partial shell;

wherein said assembled shell has a first seam where said first joining face of said first partial shell meets said first joining face of said second partial shell;

wherein said assembled shell has a second seam where said second joining face of said first partial shell meets said second joining face of said second partial shell;

wherein said first seam and said second seam define a plane referred to as the joining plane;

wherein in said assembled shell, said protrusion is adapted to provide structural reinforcement to said assembled shell; and wherein said first partial shell and said second partial shell are manufactured from a fiber-reinforced thermoplastic material, the fibers being arranged in a variety of orientations in order to provide structural strength to said first and partial shells so that they may withstand forces imposed from a variety of directions.

14. A lightweight structural component for a vehicle, the structural component comprising:

a first partial shell, said first partial shell having a proximal side and a distal surface, a second partial shell, said second partial shell having a proximal side and a distal surface, said first and second partial shells being joined to form an assembled shell, an outer shell skin on said distal surface of each of said partial shells, said outer shell skins forming an exterior surface of the assembled shell, an interior cavity located on the proximal side of each partial shell, said interior cavities each having a volume that includes a hollow cavity, first and second joining faces located along the length of each of said partial shells, said first joining face of said first partial shell being in firm contact with said first joining face of said second partial shell in the assembled shell, and said second joining face of said first partial shell being in firm contact with said second joining face of said second partial shell in the assembled shell, a protrusion located on a joining face of said first partial shell and a receptacle located on a corresponding joining face of said second partial shell, said protrusion protruding into said receptacle and engaging therewith in the assembled shell, a reinforcing rib located on the proximal side of one of said partial shells, said reinforcing rib being adapted to provide structural strength to said assembled shell, an internal protrusion located on the proximal side of one of said partial shells, and an internal receptacle located on the proximal side of one of said partial shells, said internal protrusion being adapted to protrude into and engage with said internal receptacle in the assembled shell;

wherein said assembled shell has a first seam where said first joining face of said first partial shell meets said first joining face of said second partial shell;

wherein said assembled shell has a second seam where said second joining face of said first partial shell meets said second joining face of said second partial shell;

wherein said first seam and said second seam define a plane referred to as the joining plane;

wherein said engaged protrusions and receptacles impede movement of said first partial shell with respect to said second partial shell in any direction on the joining plane; and wherein said first partial shell and said second partial shell are manufactured from a fiber-reinforced thermoplastic material.

15. A structural component as recited in claim 14 further comprising an attachment mechanism adapted to prevent separation of said joining faces in said assembled shell.

16. A structural component as recited in claim 14 wherein said reinforcing fibers are arranged in a variety of orientations in order to provide structural strength to said first and partial shells so that they may withstand forces imposed from a variety of directions.

17. A structural component as recited in claim 14 further comprising:

a tang located on the proximal surface of one of said partial shells, a clevis located on the proximal surface of one of said partial shells;

wherein said clevis is adapted to receive and engage with said clevis in the assembled shell; and wherein said tang and clevis are adapted to impede movement of said first partial shell with respect to said second partial shell in the joining plane.

18. A structural component as recited in claim 17 wherein said tang has a cross-sectional configuration resembling the assembled shell and said clevis is configured as a two-part clevis with a proximal clevis wall and a distal clevis wall, the proximal and distal clevis walls having an interstitial space between them, said clevis walls being adapted to receive said tang.

19. A structural component as recited in claim 18 wherein said tang and said clevis have a bonding agent on their contact surfaces to keep said first and second partial shells firmly engaged with each other in the assembled tube and to prevent movement of said first partial shell with respect to said second partial shell in a direction generally orthogonal to the joining plane.

20. A structural component as recited in claim 14 further comprising an attachment mechanism installed on said assembled shell, said attachment mechanism being adapted to prevent movement of said first partial shell with respect to said second partial shell in a direction generally orthogonal to the joining plane.

21. A structural component as recited in claim 14 further comprising an attachment mechanism installed on said assembled shell, said attachment mechanism being adapted to prevent movement of said first partial shell with respect to said second partial shell in a direction generally orthogonal to the joining plane;

wherein said attachment mechanism extends through a clevis and into a tang to provide additional structure that prevents movement of said first partial shell with respect to said second partial shell in any direction in the joining plane and in a direction generally orthogonal to said joining plane.

22. A structural component as recited in claim 14 further comprising a second receptacle into which said protrusion is adapted to protrude;

wherein said attachment mechanism extends through said protrusion and into said second receptacle to impede movement of said first partial shell with respect to said second partial shell in the joining plane and in a direction generally orthogonal to the joining plane.

23. A lightweight structural component comprising:

a first partial shell, said first partial shell having a proximal side and a distal surface, a second partial shell, said second partial shell having a proximal side and a distal surface, said first and second partial shells being joined to form an assembled shell, an outer skin on said distal surface of each of said partial shells, said outer skins forming an exterior surface of the assembled shell, a first joining face located on said first partial shell, a second joining face located on said second partial shell, said first joining face of said first partial shell being in firm contact with said first joining face of said second partial shell in the assembled shell, said second joining face of said first partial shell being in firm contact with said second joining face of said second partial shell in the assembled shell, a reinforcing rib located on the proximal side of one of said partial shells, said reinforcing rib being adapted to provide structural strength to said assembled shell, a protrusion located on a joining face of said first partial shell, and a receptacle located on a joining face of said second partial shell;

wherein in said assembled shell, said protrusion protrudes into said receptacle;

wherein said protrusion protruding into said receptacle impedes movement of said first partial shell with respect to said second partial shell;

wherein said structural component is manufactured from a fiber-reinforced thermoplastic material.

24. A structural component as recited in claim 26, further comprising a tang and a clevis, said clevis being structurally configured to receive and to firmly engage said tang.

25. A structural component as recited in claim 23 further comprising an attachment mechanism used to join said first partial shell and second partial shell together into an assembled shell.

26. A structural component as recited in claim 23 wherein said receptacle and said protrusion have a hole through which an attachment mechanism may be fastened.

27. A structural component as recited in claim 26 further comprising an attachment boss through which an attachment mechanism may be installed.

28. A structural component as recited in claim 27 wherein said attachment boss comprising an area of thickened material located on said outer skin, and a hole located in the approximate center of said thickened material.

29. A structural component as recited in claim 24 wherein said clevis comprises two generally parallel clevis walls between which there is a gap in which said tang is located in the assembled shell; and wherein said tang and clevis are adapted to prevent movement of said first partial shell with respect to second partial shell.

30. A structural component as recited in claim 24 wherein said tang has a cross-sectional shape similar to the cross-sectional shape of the assembled shell and said clevis is configured as a two-part clevis with a proximal clevis wall and a distal clevis wall, the proximal and distal clevis walls having an interstitial space between them, said clevis walls being adapted to receive said tang between them in said interstitial space; and wherein said tang and clevis are adapted to prevent movement of said first partial shell with respect to second partial shell.

31. A structural component as recited in claim 29 wherein said tang and said clevis have an attachment mechanism projecting through them to keep said first and second partial shells firmly engaged with each other in the assembled shell and to prevent movement of said first partial shell with respect to said second partial shell.

32. A structural component as recited in claim 27 further comprising at least one attachment mechanism on said assembled shell, said attachment mechanism extending through a clevis and into a tang to provide additional structure that impedes movement of said first partial shell with respect to said second partial shell.

33. A structural component as recited in claim 23 wherein said protrusion and said receptacle have a bonding agent on their surfaces to keep said first and second partial shells firmly engaged with each other in the assembled shell and to impede movement of said first partial shell with respect to said second partial shell.

34. A structural component as recited in claim 23, wherein said protrusion has a contact surface for contacting said receptacle, and said receptacle has a contact surface for contacting said protrusion; and wherein the contact surface of said protrusion is configured to be at a slightly greater angle from their its center axis than the corresponding contact surface of said receptacle, so that in said assembled shell said protrusions' contact surface is in firm, pressurized contact with the corresponding contact surface of said receptacle.

35. A structural component as recited in claim 23, wherein one of said joining faces is situated at about a 45 degree to 135 degree angle to the tangent of said exterior surface of the assembled shell at the point where said joining face and exterior surface meet.

36. A structural component as recited in claim 23, wherein said joining face is situated at about a 60 degree to 120 degree angle to the tangent of said exterior surface of the assembled shell at the point where said joining face and exterior surface meet.

37. A structural component as recited in claim 23, wherein one of said joining faces is situated at about a 80 degree to 110 degree angle to the tangent of said exterior surface of the assembled shell at the point where said joining face and exterior surface meet.

38. A structural component as recited in claim 23 wherein said first and second partial shells are joined together into an assembled shell with a bonding agent.

39. A structural component as recited in claim 23 wherein said first and second partial shells are joined together into an assembled shell by welding.

40. A structural component as recited in claim 23 wherein said first and second partial shells are joined together by use of a fastener.

41. A structural component as recited in claim 23 further comprising a reinforcing rib located on the proximal side of one of said partial shells, said reinforcing rib being adapted to provide structural strength to said assembled shell.

42. A structural component as recited in claim 23 wherein said protrusion is located on said proximal side of said first partial shell, and said receptacle is located on said proximal side of said second partial shell.

43. A structural component as recited in claim 23 further comprising:

an attachment boss located on the exterior surface of said assembled shell, and an attachment mechanism adapted to be installed into said attachment boss in order to secure said first partial shell with respect to said second partial shell;

wherein said attachment mechanism is selected from the group consisting of bolts, rivets, screws, pins, and nails.

44. A structural component as recited in claim 23 wherein said protrusion is selected from the group consisting of cones, tabs, pins, pegs, and locking lips.

45. A lightweight structural component for a human-powered vehicle, the structural component comprising:

a first partial shell, said first partial shell having a proximal side and a distal surface, a second partial shell, said second partial shell having a proximal side and a distal surface, said first and second partial shells being joinable to form an assembled shell, an outer shell skin on said distal surface of each of said partial shells, said outer shell skins forming an exterior surface of the assembled shell, an interior cavity located on the proximal side of each partial shell, each of said interior cavities having a volume that is substantially hollow, first and second joining faces located along the length of each of said partial shells near its outer skin, said first joining face of said first partial shell being in firm contact with said first joining face of said second partial shell when the assembled shell is assembled, and said second joining face of said first partial shell being in firm contact with said second joining face of said second partial shell when the assembled shell is assembled, a plurality of protrusions located along a joining face of said first partial shell and a plurality of receptacles located on a corresponding joining face of said second partial shell, said protrusions being arranged to protrude into said receptacles and engage therewith partial shells are assembled into an assembled shell, an internal protrusion located on the proximal side of one of said partial shells, and an internal receptacle located on the proximal side of one of said partial shells, said internal protrusion being located to protrude into said internal receptacle and to engage therewith in the assembled shell;

wherein assembly of said first and second partial shells into said assembled shell results in said assembled shell that has a first seam where said first joining face of said first partial shell meets said first joining face of said second partial shell;

wherein assembly of said first and second partial shells into said assembled shell results in said assembled shell that has a second seam where said second joining face of said first partial shell meets said second joining face of said second partial shell;

wherein at least one of said internal protrusions comprises a tang and at least one of said internal receptacles comprises a clevis, said clevis being structurally configured to receive and to firmly engage said tang in the assembled shell; wherein said tang is configured in cross-sectional shape like the assembled shell and said clevis is configured as a two-part clevis with a proximal clevis wall and a distal clevis wall, the proximal and distal clevis walls having an interstitial space between them, said clevis walls being adapted to receive said tang; and wherein said tang and clevis are adapted to prevent movement of said first partial shell with respect to said second partial shell in any direction in the joining plane in the assembled shell;

wherein said first seam and said second seam define a plane referred to as a joining plane; and wherein assembly of said first and second partial shells into said assembled shell results in said assembled shell that has engaged protrusions and receptacles which prevent movement of said first partial shell with respect to said second partial shell in any direction on the joining plane.

46. A structural component as recited in claim 54 wherein said tang and said clevis further comprise an attachment mechanism to keep said first and second partial shells firmly engaged with each other in the assembled shell and to prevent movement of said first partial shell with respect to said second partial shell in a direction generally orthogonal to the joining plane.

47. A structural component as recited in claim 45, further comprising an attachment mechanism.

48. A structural component as recited in claim 45, wherein said attachment mechanism is selected from the group consisting of screws, bolts, rivets, nails, clips and hooks.

* * * * *